United States Patent
Girsh

(12)
(10) Patent No.: US 6,197,356 B1
(45) Date of Patent: Mar. 6, 2001

(54) PROCESS FOR PREPARING HYPOALLERGENIC FOODS

(75) Inventor: Leonard S. Girsh, Palm Beach, FL (US)

(73) Assignee: ImmunoPath Profile, Inc., Palm Beach, FL (US)

( * ) Notice: Subject to any disclaimer, the term of this patent is extended or adjusted under 35 U.S.C. 154(b) by 0 days.

(21) Appl. No.: 09/080,968

(22) Filed: May 19, 1998

Related U.S. Application Data

(63) Continuation-in-part of application No. 09/058,469, filed on Apr. 10, 1998, now abandoned, and a continuation-in-part of application No. 09/058,430, filed on Apr. 10, 1998, now abandoned, said application No. 09/058,469, said application No. 09/058,430, is a continuation-in-part of application No. 08/591,503, filed on Aug. 2, 1996, now Pat. No. 5,753,296, which is a continuation-in-part of application No. 08/100,905, filed on Aug. 3, 1993, now abandoned.

(51) Int. Cl.$^7$ ................. A23B 4/16; A23L 1/025
(52) U.S. Cl. ............ 426/312; 426/11; 426/632; 426/633; 426/656; 426/657; 426/593; 424/810
(58) Field of Search .................... 426/312, 593, 426/656, 657, 11, 632, 633; 424/810

(56) References Cited

U.S. PATENT DOCUMENTS

| 309,609 | 12/1884 | D'Heureuse | 426/312 |
| 2,761,781 | 9/1956 | Bailey | 426/312 |
| 3,442,660 | 5/1969 | Shank | 426/312 |
| 3,923,847 | 12/1975 | Roselius et al. | 260/412.8 |
| 3,939,281 | 2/1976 | Schwengers | 426/11 |
| 4,078,093 | 3/1978 | Girsh | 426/660 |
| 4,776,173 | 10/1988 | Kamarei et al. | 62/63 |
| 4,810,519 | 3/1989 | Myers et al. | 426/618 |
| 5,366,754 | 11/1994 | Rudan et al. | 426/633 |
| 5,464,649 | 11/1995 | St. John et al. | 426/660 |

FOREIGN PATENT DOCUMENTS

| 36309451 | 4/1988 | (JP) . |
| 95/03708 | 2/1995 | (WO) . |

*Primary Examiner*—Helen Pratt
(74) *Attorney, Agent, or Firm*—Seidel, Gonda, Lavorgna & Monaco, PC

(57) ABSTRACT

Common allergenic foods are made hypoallergenic by treatment with super critical fluid or critical liquid gas such as super critical carbon dioxide or liquid nitrogen. The treatment of foods with liquid nitrogen or super critical carbon dioxide also enhances the functionality of fat, so that the total fat in the food can be reduced while retaining the good taste of the food.

15 Claims, No Drawings

PROCESS FOR PREPARING HYPOALLERGENIC FOODS

CROSS-REFERENCE TO RELATED APPLICATION

This is a continuation-in-part of my co-pending applications U.S. Ser. No. 09/058,469, filed Apr. 10, 1998, and U.S. Ser. No. 09/058,430, filed Apr. 10, 1998, both abandoned which are continuations-in-part of my application U.S. Ser. No. 08/591,503, filed Aug. 2, 1996 (International Filing Date), now U.S. Pat. No. 5,753,296 which is a continuation-in-part of U.S. Ser. No. 08/100,905, filed Aug. 3, 1993, now abandoned.

FIELD OF THE INVENTION

The invention relates to a method for reducing the allergenicity and fat of a food. The invention further relates to methods and compositions for the oral delivery of a medicament or vitamin.

BACKGROUND OF THE INVENTION

Many common foods contain various allergens, and food allergy is common in both adults and children. The symptoms of food allergy include mild to severe allergic skin eruptions, respiratory tract allergy (allergic rhinitis and asthma), gastrointestinal reactions, migraine and allergic anaphylaxis. Foods which are generally regarded as being particularly allergenic include chocolate, peanuts and other nuts, milk and products containing milk protein, wheat, eggs, corn, pork, soy bean, tomato, orange, seafood, fish spices, condiments, wine, and other products of fermentation.

Chocolate contains various allergens, and chocolate allergy is common in both adults and children. Chocolate is manufactured from the beans of the *Theobroma cacao tree*. The cantaloupe-like slime of the cut cocoa pod is fermented, along with the bean, under leaves of the tree to bring out flavor. The shelled beans are broken into fragments called nibs. The nibs are finely ground into a liquid which is free flowing above its melting point (94–96° F.). The liquid at body temperature is known as "chocolate liquor". This liquor comprises cocoa butter and cocoa powder. When chocolate liquor is heated and placed under pressure, the cocoa butter, which is fat, is squeezed out of the liquor and separated from the remaining mass of material. The remaining mass is finely ground to produce cocoa powder. The allergenic protein-containing component most evident resides in the unprocessed native chocolate liquor and in cocoa derived therefrom.

Although cocoa powder is used in many chocolate-flavored food products, it is the chocolate liquor which is primarily used in chocolate-flavored food products such as chocolate bars and chocolate confections. Regardless of whether cocoa powder or the complete chocolate liquor is utilized, the product will be allergenic due to the allergenic proteins in the cocoa powder component.

Migraine, in particular, is a common manifestation of chocolate intolerance or allergy. In a double blind study, chocolate ingestion was followed by a typical migraine episode in 5 out of 12 sensitive patients, while none of eight patients challenged with a placebo had an attack (Gibb et al., *Cepahalagia* 11, 93–95, 1991). The study utilized a chocolate prepared from cocoa powder, not complete chocolate liquor, according to the usual method for making chocolate. Had chocolate liquor been used, it is likely that migraine would have been observed in 100% of the sensitive patients. Furthermore, by presenting the chocolate as a tasteless capsule, this study bypassed the oral mucosal absorptive surface, and absorption through oral mucosal surfaces is a vital part of the migraine and/or allergy process. Because of the widespread use of chocolate as a component or flavoring in food products, there is a need for a hypoallergenic chocolate having the taste of natural chocolate, but lacking in allergenicity.

U.S. Pat. No. 4,078,093 describes a hypoallergenic chocolate prepared by treating cocoa powder so as to denature substantially all of the protein allergens which cause chocolate allergies. Denaturation is achieved by a prolonged two-step heat treatment. In a first step, cocoa powder is prepared by heating the ground nibs of roasted cocoa beans at 215–300° F. at 5500–8000 lb./in$^3$ for 15–90 minutes. In the second step, the cocoa powder prepared in the first step, is combined with cocoa butter and sugar and further heat-treated at 180–190° F. for 48–96 hours.

Chocolate and chocolate-style hypoallergenic compositions, as well as methods of preparing said compositions, are described in my copending application U.S. Ser. No. 08/591,503, which is incorporated in its entirety herein by reference.

Peanuts and other nuts are among the most severe common allergens have been referred to as "super allergens." These foods present a potential catastrophic anaphylactic risk. Peanut allergy is usually a lifetime affliction of severe food allergy, and accounts for 70% of severe anaphylactic reactions, the remainder being due mainly to tree nuts (almost 30%), shrimp, and lobster.

The food industry has voluntarily adopted stringent regulations for the clean-up and labeling of allergen containing foods. Significant efforts and costs are expended each year in the recall of foods suspected to contain traces of allergens. There is a great need for methods of reducing the allergenicity of foods, both to improve food safety and to permit allergic individuals to enjoy conmmon foods. There is also a need for improved methods for the reduction of fat in foods.

Improved methods and compositions for the oral delivery of medicaments and vitamins are also needed. Such oral methods and compositions would decrease the use of hypodermic, intramuscular, and IV injections in patient care with resulting great savings in discomfort, labor, and costs.

SUMMARY OF THE INVENTION

The present invention provides a method for reducing the allergenicity of a food comprising treating the food with a super critical fluid or critical liquid gas. In a preferred embodiment the food is treated with super critical carbon dioxide or liquid nitrogen.

In some embodiments the food comprises one or more ingredients selected from the group consisting of wheat, egg, corn, pork, soy bean, tomato, orange, seafood, fish, milk and milk protein, spices, condiments, nuts, and wine.

In one preferred embodiment, the food comprises one or more ingredients selected from the group consisting of wheat, corn, soy bean, spices, and nuts. In a more preferred embodiment, the food is ground into a powder before treatment.

In another preferred embodiment the food comprises wheat.

In some preferred embodiments the food comprises fat and the fat is not removed from the treated food.

In one preferred embodiment the food comprises nuts, in a more preferred embodiment the food comprises peanut, in a most preferred embodiment the food comprises chopped peanuts, peanut flour, or peanut paste. In some embodiments the food comprises peanut flour and the flour is so degraded that there is an at least about 50% reduction, and preferably an at least about 65% reduction, in the particle size of the flour. In other embodiments peanut allergens, as measured using ELISA or RIA, are decreased at least about 10-fold, preferably at least about 100-fold, and more preferably at least about 285-fold after treatment.

In another preferred embodiment the food comprises one or more ingredients selected from the group consisting of pork, tomato, soy bean, orange, seafood, and fish. In a more preferred embodiment the food is finely chopped before treatment.

In some preferred embodiments the food comprises one or more ingredients selected from the group consisting of egg and milk products, preferably powdered egg or powdered milk.

In a preferred embodiment the food comprises starch and the starch is so degraded by the treatment that there is an essential absence of birefringent starch granules upon polarizing microscopic examination.

The invention also provides a method of reducing the fat in peanut butter without increasing the amount of water comprising adding at least about ½% by weight of high phosphatidyl choline lecithin, and treating the peanut ingredients with liquid nitrogen or supercritical carbon dioxide. In a preferred embodiment the total fat content of the peanut butter is less than 26%. The invention further provides reduced fat peanut butter compositions. In a preferred embodiment the peanut butter composition has a total fat content of less than about 33%. In another preferred embodiment the peanut butter composition has a total fat content of less than about 22%.

The invention further provides a method of making a chocolate composition bakery coating without the use of a conch comprising preparing a chocolate composition comprising super critical carbon dioxide or liquid nitrogen treated cocoa, sugar which has been refined to be equivalent to 10× sugar wherein the sugar does not contain corn starch, and at least about ½% by weight high phosphatidyl choline lecithin; and extruding the chocolate composition through a screw type extruder. In a preferred embodiment the total fat content is less than about 25%; in a more preferred embodiment the total fat content is less than about 24%.

The invention also provides a composition for the oral delivery of a medicament or vitamin comprising the medicament or vitamin and a vehicle comprising fat, wherein the fat includes a phospholipid in the amount of from about 0.1% to about 0.6% based upon the total vehicle weight. In a preferred embodiment the composition further comprises a low molecular weight and low caloric density fat. In a most preferred embodiment the vehicle further comprises a sweetener and cocoa powder which has been treated with a super critical fluid or critical liquid gas. In some embodiments the medicament or vitamin is coated with the vehicle; in other embodiments the medicament or vitamin is mixed with the vehicle. In some embodiments the vehicle further comprises a flavored oil, preferably an orange, cherry, or grape flavored oil.

In a preferred embodiment the medicament is selected from the group consisting of acetylsalicylic acid, acetaminophen, dihydroergotamine, hydroxyzine, dextromethorphan, glycerol guaiacolate, and potassium guaiacosulfate.

In another preferred embodiment the composition comprises a mixture of at least two vitamins; in a more preferred embodiment the composition comprises at least one mineral.

The invention further provides methods for preparing a composition for the oral delivery of a medicament or vitamin or mineral.

In another embodiment the invention provides a method for human allergy testing comprising contacting a sample containing a suspected allergen with patient serum and quantitating the ability of the sample to bind IgE in the serum, wherein the quantity of allergen and degree of allergenicity is detected as the amount of IgE-binding. In a preferred embodiment the serum is from a patient known to be sensitive to the allergen. In a more preferred embodiment the sample is a food, and in a most preferred embodiment the food comprises milk protein or peanut allergen.

The invention also provides a method for administering a medicament or vitamin to a patient comprising preparing a composition comprising the medicament or vitamin and a vehicle comprising fat, wherein the fat includes a phospholipid in the amount of from about 0.1% to about 0.6% based upon the total vehicle weight; and contacting the composition with the oral mucosa of the patient, whereby the medicament or vitamin is absorbed through the oral mucosa. In a preferred embodiment the phospholipid comprises from about 35% to about 100% by weight of phosphatidyl choline. In a more preferred embodiment the composition further comprises a low molecular weight and low caloric density fat. In a most preferred embodiment the vehicle further comprises a sweetener, a dairy component, and cocoa powder which has been treated with a super critical fluid or critical liquid gas. In another most preferred embodiment the vehicle further comprises chocolate liquor which has been treated with a supercritical fluid or critical liquid gas.

In some embodiments the medicament or vitamin is coated with the vehicle; in other embodiments the medicament or vitamin is mixed with the vehicle. In some embodiments the vehicle further comprises a flavored oil, preferably an orange, cherry, or grape flavored oil. In a preferred embodiment the medicament is selected from the group consisting of acetylsalicylic acid, acetaminophen, dihydroergotamine, hydroxyzine, dextromethorphan, glycerol guaiacolate, and potassium guaiacosulfate. In another preferred embodiment the composition comprises a mixture of at least two vitamins; in a more preferred embodiment the composition comprises at least one mineral. In a most preferred embodiment the composition is formulated as 25 to 45 micron spheres or as very fine alpha crystal particles.

By "food" is meant any compound or composition intended for consumption, including compounds and compositions which are consumedperse as well as compounds and compositions used as ingredients, components, and/or flavorings in other compositions.

By "dairy component" is meant milk, or any fraction thereof, such as including but not limited to skim milk, whey, whey permeate, dairy permeate, powdered milk, or dairy protein concentrate. Foods containing potentially allergenic milk protein include milk, cheese, and ice cream.

By "dairy permeate" is meant a liquid portion of milk or whey which is collected upon passage of milk or whey, or liquid fraction of milk or whey, through a filter having a molecular size exclusion sufficient to filter out proteins in fact present in the milk or whey, such that the permeate contains no more than about 0.25 wt % milk protein, preferably no more than about 0.1 wt % milk protein, most preferably no more than about 0.025% milk protein.

Preferably, the dairy permeate results milk or whey using a filter having a molecular size exclusion of at least as small as about 20 kDa. All or a substantial portion of the moisture is removed by drying. By "dried dairy permeate" is meant a solid which remains after all or a substantial portion of the moisture is removed from the liquid permeate, such as by drying in spray drying oven.

"Milk permeate" means a dairy permeate from filtration of milk. "Whey permeate" means a dairy product from filtration of whey.

By "milk" is meant not only whole milk, but also skim milk or any liquid component thereof. By "whey" is meant the milk component remaining after all or a substantial portion of the fat and casein contained are removed.

By "dairy concentrate" is meant a preparation containing all or part of the dairy protein content of whole milk, but in a form in which the dairy protein exists in a higher concentration than in whole milk. By "milk protein concentrate" is meant a dairy protein concentrate formed from whole or skim milk. By "whey protein concentrate" is meant a dairy protein concentrate formed from whey.

By "room temperature" is meant 68–78° F.

All percentages expressed herein are weight percentages, unless indicated otherwise.

DETAILED DESCRIPTION OF THE INVENTION

It has been unexpectedly discovered that the allergenicity of foods may be reduced by treatment with a super critical fluid, preferably super critical carbon dioxide, or a critical liquid gas, preferably liquid nitrogen.

Super critical $CO_2$ is an ideal solvent. It has the density of a liquid, but is also highly penetrable and defeasible since it has the properties of a gas. It is viricidal, bactericidal and fungicidal. Liquid nitrogen has been used in the food industry to freeze foods and to cryogenically grind foods. For freezing, foods are typically immersed in liquid nitrogen for a few (1–15) seconds, with equilibration at 0° F., to form small crystals that don't distort taste and to form a crust and prevent adhesion. This method is often more cost efficient than the use of a mechanical freezer. The resulting cryogenic gas is recycled as phase 2 in the assembly line as foods are brought to freezing equilibrium (e.g. 0° F.). In the case of ground meat for hamburgers, many government regulations require freezing at a temperature of –5° F. to –10° F. Foods such as spices are typically brought to –20° F. to –40° F. for less than one minute for grinding in liquid nitrogen. According to the present invention, foods are submerged in liquid nitrogen for a sufficient time, generally several minutes, to reduce the allergenicity. A benchmark of successful treatment is reduced allergenicity as measured by protein immunochemistry studies including reduced allergen binding to serum IgE from a food allergic patient or to serum from an animal that has been immunized and sensitized to the allergen. In the case of foods containing starch another benchmark of successful treatment is the absence of the Maltese Cross upon polarizing microscopy. For particularly allergenic foods such as peanut and, to a lesser extent milk, a contact time of 15–30 minutes is used in order to insure maximal safety of the resulting food. Foods treated according to the invention may reach a temperature as low as –320° F. Liquid nitrogen is also viricidal, bactericidal, and fungicidal, particularly at this longer and lower cryogenic temperature.

Reactive components in vaccines derived from plant, animal, bacterial, fungal, or viral products or derivatives thereof may be attenuated or inactivated by treatment with super critical carbon dioxide or liquid nitrogen. For example, egg allergens in measles vaccine, pollen and mold allergens, and their reactive epitopes and moieties may be excluded. The degree of risk may be measured using human IgE and/or serum from animals sensitized or immunized with the allergens in question. The extended use of liquid nitrogen (immersion exposure 15–30 minutes or more) may also help, in combination with conventional public health measures, to counter viral-like causative factors such as prions. Prions are poorly characterized, slow infectious agents (thought to be infectious proteins) that cause mad cow disease, scrapie in sheep, and equivalent disease in humans.

While super critical fluid has been utilized to extract fat from cocoa powder, it has not been heretofore recognized that the resulting fat-free cocoa powder is substantially hypoallergenic. The powder is rendered hypoallergenic by the defatting procedure alone, without the need for heat denaturation of the protein allergens.

It has now been found that the super critical fluid treatment, which results in substantially completely defatted cocoa powder (>99% fat-free), surprisingly also results in a powder which is hypoallergenic. Without wishing to be bound by any theory, it is believed that separation of the fat using super critical $CO_2$ may impact on the three-dimensional structure of the protein component of cocoa powder, such that the human immune system will no longer recognize the proteins contained in the cocoa powder as allergens. Moreover, it has been unexpectedly discovered that it is not essential to remove fat from the treated food in order to obtain the desired reduction in hypo allergenicity. As an example, hypoallergenic chocolate liquor may be prepared by treating chocolate liquor (which comprises cocoa butter) with liquid nitrogen, and the resulting product may be used in hypoallergenic compositions. The cocoa derived from chocolate liquor can also be treated with liquid nitrogen.

Without wishing to be bound by any theory, it is believed that super critical fluid or critical liquid gas treatment causes a change in the structure of protein. It has been noted that super critical fluid or critical liquid gas treatment results in a microscopic change to the carbohydrate component of foods containing starch. The starch granules in chocolate liquor and cocoa powder as processed according to U.S. Pat. No. 4,078,093 (heat treatment) gave the "Maltese cross" appearance under polarizing microscopy which is characteristic of intact starch granules. The starch granule was degraded. Super critical $CO_2$-defatted cocoa powder and liquid nitrogen treated chocolate liquor, however, gave no such characteristic readings under polarizing microscopy, indicating that processing with super-critical $CO_2$, resulting in nearly 100% fat separation and extraction, also had an effect on the granular structure of the starch in the cocoa powder. It is believed that a physical or chemical change in the protein structure of cocoa powder may also occur upon fat separation and defatting with super critical $CO_2$, such that the protein remaining in the cocoa powder is rendered essentially hypoallergenic. Immunologic studies have shown that the protein component undergoes immunochemical changes when treated according to the present invention.

The methods according to the invention may also be used to treat grains containing gluten and gliadin, so that they can be consumed by individuals suffering from the allergy-like condition gluten sensitive enteropathy (non tropical sprue or celiac disease). Gluten sensitive enteropathy is characterized by sensitivity to the gliadin protein fraction of gluten; as little as 3 grams of this protein can produce a severe flare up in a symptom free patient in remission or result in severe diarrhea and fatty diarrhea or steatorrhea. The condition may be relieved by avoidance of the gluten fraction in most grains (e.g., wheat, oats, barley, and rye). Diets for gluten sensitive enteropathy were first described in 1950, but are complex and difficult to follow. The treatment of grains according to the present invention can be monitored by polarizing microscope examination (loss of the "Maltese Cross"), and by the relative amounts of gluten and gliadin (measured immunologically).

The fat separation and/or defatting process can also result in the elimination of mold, since the coating of microscopic mold spores comprises fat. Super critical $CO_2$ treatment disrupts cell walls of microorganisms such as highly allergenic mold spores. Removal of viable mold allows the cocoa powder to be utilized in soft drink plants, where the presence of mold is highly undesirable. Moreover, while some viable yeast and mold spores may survive roasting of cocoa beans, those spores will be killed upon super critical $CO_2$ processing, which is fungicidal as well as bactericidal. Many migraine patients triggered by chocolate may also be reactive to other mold-containing foods, such as wine and cheese. It is believed that removal of the mold may greatly contribute to the reduced allergenicity of the fat-free cocoa powder. The treatment also disrupts the three-dimensional antigenic and allergenic structures of chocolate which are recognized by the immune system, and which are responsible for the hypersensitive allergic reaction. Essentially fat-free (>99 wt. % fat-free) cocoa powder may be prepared, for example, according to the process of U.S. Pat. No. 3,923,847. Cocoa powder is contacted with $CO_2$ which has been brought to super critical conditions in respect to temperature and pressure. The fat, in the form of cocoa butter, is extracted from the cocoa powder into the super critical fluid phase. The cocoa butter may then be recovered from the super critical fluid phase. According to U.S. Pat. No. 3,923,847, pressures above 75.3 atmospheres, which is approximately the critical pressure of $CO_2$, and temperatures above the $CO_2$ critical temperature (31.6° C.), are necessary for fat extraction. In practice, a pressure above 100 atmospheres gauge, and preferably between 200 and 400 atmospheres gauge, may be used. It is only necessary to work slightly above the $CO_2$ critical temperature. Preferably, the temperature is in the range of from about 40° C. to about 60° C. The contact time between the super critical $CO_2$ fluid and the cocoa powder may generally comprise from about 2 to about 10 hours, with 4–5 hours being preferred.

Defatted cocoa powder may be prepared by defatting treatment with super critical $CO_2$. While cocoa powders defatted with solvents other than $CO_2$ may be used, they are less preferred than $CO_2$. The latter is a substance present in ambient air, as well as body tissues and fluids. Hence it is ideal for food processing. Some super critical fluid solvents, such as hexane, may leave a residue which can trigger an allergic or asthmatic reaction in sensitive patients. The super critical fluid may comprise any solvent which will not leave a toxic residue.

A benchmark of the requisite degree of processing which is believed sufficient to result in a cocoa powder which is essentially hypoallergenic is the essential absence of the birefringent "Maltese cross" appearance of starch granules in the cocoa. The cocoa powder is preferably alkalized prior to treatment. Alkalization enhances the color and flavor of the cocoa powder, and has a fungicidal effect. Methods for alkalizing cocoa powder are known to those skilled in the art.

Foods other than cocoa powder may be molecularly modified in a similar fashion to enhance tolerance by the allergic population, by treatment with a super critical fluid solvent, preferably $CO_2$ or a critical liquid gas, preferably liquid nitrogen. Foods generally regarded as being particularly allergenic, which can be treated according to the present invention, include chocolate, wheat, eggs, corn, pork, soybean, tomato, orange, seafood, fish, milk protein, spices, condiments, nuts, wine, cheese, and products of fermentation. Foods are or become allergenic individually or in the general population by sensitization, marketing, introduction, or removal. For example, cottonseed protein meal was a common allergen four decades ago, but today is very uncommon in the food chain and in allergy sensitization. In contrast, peanut has become preeminent in the food chain, particularly in the past few years and decades, and is also preeminent in allergenicity today. Foods benefit by super critical fluid or critical liquid gas treatment to reduce allergenicity along with fat separation. Without wishing to be bound to a theory, the observation that fat separation appears to aid in hypoallergencity may be related to the fact that proteins gain entrance to the GI tract in the form of lecithin lipoprotein chylomicron particles. In some embodiments, the treatment will also reduce fat and calories and therefore aid in the prevention of atherosclerosis.

In addition to reducing allergenicity, treatment with super critical fluid or critical liquid gas increases the functionality of fat, so that treated foods can have a reduced fat content without reducing the good taste of the food. As an example, liquid nitrogen treated powdered skim milk has a creamy taste, illustrating the enhanced utilization of fat. Skim milk having only ½% fat, which has been treated with supercritical carbon dioxide or liquid nitrogen, can therefore be used to replace some of the fat in foods without affecting the taste or texture. Moreover, the treatment reduces the content of toxic residues, such as insecticides, pesticides, hormones, and antibiotics, in the food.

For super critical fluid or critical liquid gas treatment, these food items are ideally, but not necessarily, first reduced in size. Grains and nuts are ideally, but not essentially, ground into a powder. Meats, fruits and other items should be finely chopped. The contact time between the super critical fluid and the food item may range from about 2 to about 10 hours, with 4–5 hours being preferred. The temperature and pressure are maintained at the appropriate values to ensure the solvent remains in the super critical fluid state. In the case of liquid nitrogen, a contact time of approximately 15–30 minutes is adequate. In some embodiments the use of liquid nitrogen provides a cost advantage over the use of super critical $CO_2$: $CO_2$ treatment costing approximately $1.00 per pound, and liquid nitrogen treatment costing approximately $0.05 per pound.

The allergen content of foods treated according to the present invention may be assayed using immunological methods known to the skilled artisan, such as radioimmunoassay (RIA) and enzyme-linked immunosorbent assay (ELISA). As an example, commercial laboratories routinely use ELISA to assay the content of peanut allergen in foods.

In performing the ELISA, it is particularly preferred to use serum from a patient known to be allergic to the food being assayed. This method (ELISA measurement of the ability to bind IgE in an allergic patient's serum) provides a safe, patient-specific method of human allergy testing. It is useful to test foods treated according to the invention using both allergic patent serum and animal serum (from an animal immunized with the allergen).

Defatted hypoallergenic cocoa powder may be used in a variety of products in place of conventional cocoa powder, with greatly reduced risk of allergenic complications. Ideally, the other components of the formulation are also hypoallergenic, although for some applications, the hypoallergenic modification may be focused on just one component allergen, e.g., chocolate. Cocoa powder which has been rendered essentially hypoallergenic through super critical $CO_2$ fluid separation and extraction of fat or liquid nitrogen treatment may be used in the preparation of chocolate-style coatings, i.e., confections. The cocoa powder may be used as a flavoring in soft drinks such as sodas, sports drinks, hypoallergenic dairy drinks, enteral feeding products, fluids to replace mineral loss, and other ingestible liquids.

Where hypo allergenicity is less of a concern, super critical fluid-treated cocoa powder may be replaced with a reduced fat cocoa powder which is prepared according to conventional techniques by pressing out cocoa butter from chocolate liquor. Chocolate liquor comprises cocoa butter and cocoa powder. When chocolate liquor is heated and placed under pressure, the cocoa butter is squeezed out of the chocolate liquor and separated from the remaining mass of material. The remaining mass is finely ground to produce cocoa powder. As an example of cocoa powder production, see U.S. Pat. No. 4,078,093. The cocoa powder may be combined with fat and optional flavorings, such as salt and/or vanilla flavor, to form a hypoallergenic chocolate-style flavoring composition, as more fully described below.

The dairy component is preferably a dried dairy product, a protein concentrate or hypoallergenic dairy permeate and more preferably a critical liquid nitrogen treated whole milk or skim milk, powdered skim or whole milk, or an evaporated concentrated milk, which can be sprayed into liquid nitrogen resulting in a powdered form. The dried dairy protein concentrate advantageously comprises a milk protein concentrate or a whey protein concentrate. It less preferably comprises casein, inclusive of the acid and base salts thereof, e.g., sodium caseinate and potassium caseinate. In particular, the dried dairy protein concentrate advantageously comprises a low-lactose content concentrate. Such concentrates comprising only 4% lactose are commercially available. These low-lactose protein concentrates are used in situations where allergenicity is not a concern, but an essentially "sugar-free" (no more than 0.5 wt % sugar from any source) chocolate product is desired. Chocolate compositions, as hereinafter exemplified, which are made from such low-lactose dairy protein concentrates, are characterized by a sugar content of no more than 0.5 wt %. The sugar content comprises lactose.

In lieu of a dairy protein concentrate, a hypoallergenic dairy permeate may be employed as the dairy component. Such products may comprise any hypoallergenic fraction of milk which remains after the removal of all or substantially all of the allergenic protein present in milk. The milk permeate used to produce the chocolate composition of the invention is in the form of a dried powder, due to the anhydrous conditions in chocolate production. Generally, the permeate will comprise a dried milk permeate or a whey permeate, prepared by filtration of milk or whey respectively. While the dairy permeate is preferably derived from cow's milk, goat's milk or the milk of other mammals may be substituted. It should be noted that while the dairy permeate is rendered hypoallergenic primarily by the removal of allergenic protein through filtration, some trace protein may be tolerated in the permeate provided that subsequent processing sufficiently denatures the protein so as to render it hypoallergenic. The allergenicity of the dairy permeate may be further reduced when combined with chocolate and processing as hereinafter described.

The dairy permeate is prepared by filtration of milk or whey through a filter of sufficient exclusion size so as to filter out the proteins which would otherwise evoke an allergic reaction in sensitive individuals. For the most part, the filter will comprise an ultra filter or filtration membrane which will prevent the passage of any substance having a molecular weight of more than about 20 kDa, more preferably more than about 10 kDa. Even finer filters may be used in lieu of, or in addition to, a 20 kDa or 10 kDa filter. A finer filter may be used to exclude molecules having a molecular weight greater than about 3.5 kDa, more preferably about 2 kDa, most preferably about 1 kDa.

The preparation of hypoallergenic dairy permeates suitable for use in the practice of the present invention is described in the following U.S. Patents, the entire disclosures of which are incorporated herein by reference: U.S. Pat. Nos. 4,954,361 and 5,064,674. A pressure gradient is preferably applied across the ultra filtration membrane to facilitate filtration. Preferably, the pressure gradient is adjusted to maintain a filter flux of about 24 liters/m$^2$-hour, which is the typical dairy plant filter flux. The filter is advantageously first primed with a small amount of milk and the permeate is used for other purposes or discarded, prior to beginning filtration. Priming of the filter in this manner is believed to be advantageous to filtering efficiency. Priming is accomplished by discarding the first 15 to 120 minutes of permeate which passes through the filter. This fraction, which is obtained before the filter is operating at peak efficiency may contain protein molecules large enough to be considered allergenic, and therefore should not be utilized.

The pH of the milk during filtration should be within the range of about 2 to about 11.

The temperature of the milk during ultra filtration should be within the range of about 40° F. to about 150° F. The permeate collected from the ultra filtration process is essentially free of fat, milk protein, bacteria and bacterial protein. Various man-made chemicals which may be taken up by cows and secreted into milk are also excluded. Such chemicals include the majority of veterinary and agricultural chemicals which may be contained in animal feed or hay. The permeate may be supplemented with hypoallergenic protein, vitamins, minerals and flavoring.

The hypoallergenic protein supplement may comprise hypoallergenic protein per se, such as protein from cereal or vegetable sources. Alternatively, or additionally, it may comprise free amino acids, or polypeptides of animal source, provided the polypeptides are "short chain polypeptides", that is, they are not larger than about 1.5 kDa, preferably not larger than about 1 kDa.

Free amino acids and short chain polypeptides are hypoallergenic regardless of source, and therefore will not contribute to the allergenicity of the product.

The short chain polypeptides may comprise individual polypeptides or a mixture of polypeptides. The short chain polypeptides and amino acids may be obtained by appropriate hydrolysis of any suitable polypeptides or proteins, or may be synthetically produced. Preferably, but not necessarily, they are obtained from milk proteins, so that the supplement permeate maintains a portion of the protein nutritional content of whole milk. Hydrolysates of milk proteins are commercially available or can be specially prepared. See the hydrolysates described in U.S. Pat. Nos. 4,954,361 and 5,064,674. For example, a series of hydrolysates are highly hydrolyzed pancreatic digests of casein. Hydrolyzed pancreatic digest of another milk protein, lactalbumin, are also available. High-performance liquid chromatography indicates that these products are free of polypeptides having a molecular weight of greater than about 1.5 kDa. Hydrolysates of non-milk proteins may also be employed, such as papain digests of soy flour. Food grade preparations of synthetic amino acids may be utilized, such as certain of the Neocate family of products from Scientific Hospital Supplies (Gaithersberg, Md.).

After the hypoallergenic protein supplement and optional vitamins, minerals and additives to enhance flavor and consistency have been added to the permeate, the supplemental permeate is preferably blended in an emulsifying and diffusing apparatus operating at between about 2,500 and about 3,500 r.p.m., to ensure thorough mixing. The blended product is then homogenized at a pressure ranging from about 2,000 to about 4,000 P.S.I., pasteurized at about 145° F. for about 30 minutes, and then optionally flash sterilized at about 290° F. for about 12 seconds for prolonged shelf-life packaging. The flash sterilization process is known as ultra-high temperature (UHT) pasteurization.

The hypoallergenic dairy permeate may alternatively comprise a dairy permeate as described in my copending patent application filed on Aug. 3, 1993 for "Dairy Permeate-Based Beverage", the entire disclosure of which is incorporated herein by reference. The dairy permeate is obtained upon crude filtration of milk or whey, that is, filtration using a dairy filter or membrane having a molecular weight size exclusion of about 20 kDa or lower. For formation of a whey permeate, the whey is generally diluted at least about 20% with water prior to filtration during the cheese making process. If the whey filtration process is running properly, the permeate will have a protein content of as low as about 0.025%, based upon the weight of the permeate. Inefficient filtration, such as through a worn filter membrane, may increase the protein concentration by an order of magnitude, i.e., to about 0.25 wt. %. The protein concentration may be maintained at 0.025 wt. %, or even as low as 0%, by frequent servicing or replacement of the filter membrane/filter. Moreover, the protein content of the whey permeate can be minimized by selecting a filter/membrane with a smaller size exclusion, e.g. a 10 kDA filter. Generally, the protein content of the whey permeate should not be allowed to exceed about 0.25 wt. %.

It has been unexpectedly observed that a quality control bench mark test can be performed for 99% to complete absence of milk protein in the milk permeate at the dairy ultra filter site. This can be done in 60 seconds with a dip stick such as the Multistik device of Miles Inc. Diagnostic Division, without the need for elaborate equipment, reagents, technicians and laboratory resources. This rapid dip-stick method is a suitable alternative to more rigorous protein concentration testing methods such as the Kjeldahl test or the Udy test, or methods relying on gel electrophoresis.

A typical filter element useful in generating permeate from whey or milk comprises a polyethersulfone spiral wound membrane (Deaal Ultra filter ER 3840C) having an average selectivity of 0.01μ (nominal), a typical operating range of 20–145 psi (600 psi maximum), and a maximum pressure drop per membrane element of 60–65 psi. The usual ideal daily range of pressure is 20 psi back pressure and 80–85 psi feed pressure.

The most common change in milk products resulting from the growth of microorganisms is the development of acid. The action of cheese-making bacteria on the dairy permeate, and whey permeate in particular, may be monitored as a drop in the pH of the permeate. The pH of the dairy permeate, which is typically about 6.2–6.4 (6.3 being the most usual value) immediately after the permeate is collected, will decline to about 6.2, and possibly lower, such as to 5.9, if the cheese-making bacteria remain unchecked. Thus, the dairy permeate should be treated before the pH of the permeate falls off significantly from 6.3. It has been observed that prompt treatment delays the onset of deterioration of the pH, titratable acidity, taste and smell by 3 or more hours at room temperature. Preferably, the permeate is treated to arrest the cheese-making microbes before the pH of the permeate falls more than about 0.3 pH units from the initial pH value at the time of collection. A fall in pH of this magnitude is associated with departure from a fresh milk-like taste. It has been found that a significant increase in microbial growth (about two-fold) will occur about 2 hours following permeate collection, at about room temperature. At about one hour there is no significant change in microbial growth. The least growth is seen at about 15 minutes post collection. Thus, it is preferred that the permeate is treated to arrest microbial growth within about 2 hours of the permeate's collection, more preferably within about 1 hour, most preferably within about 15 minutes. The permeate should be treated even sooner if the dairy plant is not located in a cool climate, or is not air conditioned. Thus, where possible, the permeate is treated immediately upon collection. Where the permeate is refrigerated after collection, the interval may possibly be longer, as refrigeration will retard the action of the cheese-making microbes and preserve the flavor of the whey permeate for some time. If a dry powder is the goal, then immediate drying enhances the efficiency of energy utilized.

The treatment to arrest microbial activity is preferably coupled with permeate production in a continuous process. Accordingly, the permeate is continuously collected. The continuously collected permeate is continuously treated to arrest microbial activity. In this manner, the permeate is treated without the delay which would be attendant to batch processing and production.

The most effective treatment for arresting the action of microbes in the permeate comprises pasteurization. Pasteurization generally comprises partial sterilization at a temperature and for a period of time that destroys objectionable organisms, without major chemical alteration of the product. To arrest the activity of the cheese-making bacteria in the permeate, particularly whey permeate, pasteurization may comprise heating the permeate to a temperature of at least about 110° F., more preferably at least about 120° F., and maintaining that temperature for at least about 30 minutes. According to the so-called "holding method" or "batch pasteurization", the whey permeate may be heated to 145° F. and held at this temperature for 30 minutes with constant stirring with an agitator at 60 rpm. Alternatively, a high-temperature, short-time process ("batch pasteurization"), may be employed. The latter requires a temperature of 162° F. for 16 seconds. Even shorter duration processes (278° F. for 4–6 seconds, or 285° F. for 2 seconds) may be employed, but are not preferred because of the added expense. Any combination of time and temperature may be utilized so long as it achieves adequate pasteurization of the whey permeate to result in the arrest of microbial growth.

Pasteurization should be accompanied by constant mixing to prevent calcium phosphate from precipitating out. Mixing may be carried out by use of an automatic mixer set at a mixing speed of 60 rpm.

The dairy permeate may comprise an acid whey permeate, where a reduction in lactose is desired. Acid whey, the source of acid whey permeate, has a pH of approximately 4.7 and is similar to sweet whey in composition. However, the lactose content is reduced 20% over the lactose content of sweet whey, since up to 20% of the lactose in acid whey is converted to lactic acid by lactose-fermenting bacteria. The reduced pH of 4.7 may also be achieved by addition of food grade acids to replace lactic cultures (directly acidified cottage cheese). The acid whey permeate is batch-pasteurized immediately as produced from an ultra filtration filter at 145° F. for 30 minutes.

The dairy permeate contains substantial amounts of carbohydrate, in the form of the disaccharide lactose. The enzyme lactase (β-galactosidase) may be added to the permeate to break down lactose, in order to avert problems with consumption by lactose-intolerant individuals. Approximately 15% of the population over the age of six years, and up to 80% or more of non-Caucasian world populations, suffers from lactase deficiency. The amount of lactase added should be sufficient to substantially completely hydrolyze lactose into its component monosaccharides, galactose and glucose. The glucose contributes to the sweetening of the permeate. The liquid dairy permeate (or cocoa powder/dairy permeate premix) is dried to a powder for use in the practice of the present invention. The liquid permeate may be dried to a moisture content of about 4 wt. % by spray drying employing, for example, a dryer inlet temperature of 400° F. and a dryer outlet temperature of 200° F., a drying time of four to five hours, a pressure of 2000–2500 psi, and a 68–70 gauge spray nozzle bore. Suitable spray dryers are available from, for example, Delfab (Delaware, Ohio). Suitable spray nozzles are available, for example, from Spray Drying Systems (Wheaton, Ill.).

Alternatively, the liquid permeate may be concentrated to about 45 wt. % moisture in a suitable evaporator device, such as the devices available from Weegan (Logan, Utah). In subsequent spray drying to 4% moisture, the spray nozzle gauge should be increased to 60–62 gauge, in order to handle the thicker consistency of the evaporated permeate. Preferably, about 0.25% soy-oat powder is added to the permeate to promote drying. Soy oat powder is not necessary when supercritical $CO_2$-treated cocoa powder is added to the liquid permeate before drying. Drying by a belt-dryer may be substituted for spray drying.

It should be noted that hypoallergenic milk chocolate containing the hypoallergenic dairy permeate from which at least 99% of allergenic milk proteins have been removed, is also essentially free of the majority of veterinary chemicals, since protein comprises the principal binding sites for these chemicals.

The at least partially defatted cocoa powder and dairy permeate may be optionally combined in advance of the other chocolate composition components to form a premix. The cocoa powder may be added to the dairy permeate prior to pasteurization of the permeate, to generate the premix. According to this embodiment, the cocoa powder and dairy permeate are thoroughly mixed and heat treated, as in pasteurization, at a temperature of at least about 145° F. for at least about 2 hours. Alternatively, the cocoa powder can be added just prior to, or during, the drying of the permeate. For example, 25% of the cocoa powder to be used in the chocolate composition may be added to the liquid permeate prior to drying, with the balance being added to the drying permeate. According to another alternative, the cocoa powder may be added to the permeate following completion of permeate pasteurization. Thirty minutes of further heating at the same temperature is sufficient to attain the molecular modification through the Maillard reaction as described more particularly hereinafter. The cocoa powder is advantageously combined with the dairy permeate to form a dairy permeate/cocoa powder premix wherein the weight ratio of the cocoa powder to dairy permeate may vary over a wide range. Preferably, the ratio of cocoa powder to dairy permeate is from about 1:2 to 3:1, more preferably from about 1:2 to about 2:1. A cocoa powder/dairy permeate weight ratio of about 1:1.7 is particularly preferred.

According to an embodiment of the invention utilizing an acid whey permeate as the dairy permeate, a wet blend of permeate solids and super critical $CO_2$-treated alkalized cocoa powder (e.g., in a 1:1 weight ratio) is diluted to 11% total solids, pH 5.7, and then batch pasteurized for 30 minutes and spray dried in a spray dry oven into a powder. Acid whey permeate is advantageously utilized as the dairy permeate in applications where a reduction in lactose is desired. The lactose content is reduced by approximately 20% by the selection of an acid whey permeate. A further lactose reduction is achieved through the Malliard reaction described below, and through conching of the resulting chocolate composition.

In each of the above embodiments, and the embodiments discussed hereinafter, the dairy permeate may be substituted with a dairy protein concentrate, where milk allergy is not an issue. By selecting a low-lactose concentrate such as a commercially available 4% lactose milk or whey concentrate, an essentially sugar free (i.e., less than 0.5 wt % sugar) chocolate product may be formulated.

The dairy permeate/cocoa powder premix has utility as a precursor of the finished chocolate composition according to the present invention. The premix may advantageously be packaged and distributed in powder form. The dairy permeate/cocoa powder premix is also useful as a hypoallergenic flavoring for beverages and the like. It may be combined with hot water (e.g., 1 teaspoon per cup of water) as an instant cocoa drink.

It has been observed that the defatted cocoa powder and hypoallergenic dairy permeate, upon appropriate heat treatment, interact in a manner which provides the resulting hypoallergenic chocolate product with improved properties. Without wishing to be bound by any theory, it is believed that heat processing of the lactose in the dairy permeate causes the lactose molecules to chemically combine with protein in the defatted cocoa powder. The Maillard or "browning" reaction is a condensation reaction known to occur in food products between amino acids or amino acid moieties and sugars, without the aid of enzymes. The reaction rate doubles with each 10° C. increase in temperature above room temperature. Without wishing to be bound by any theory, it is believed that lactose in the dairy permeate combines with protein in the cocoa powder according to the Maillard reaction and other Maillard-like reactions. Since the dairy permeate is, in contrast to whey, whole milk and skim milk, essentially protein-free, there is little or no protein available in the permeate to compete with the cocoa protein for reaction with lactose.

The reaction between the lactose and the cocoa powder protein provides certain advantages. For example, I have found that, upon heat treatment such as normal pasteurization for two hours or more, the otherwise bitter taste of the dairy permeate/cocoa powder premix is considerably softened. The mixture is sweetened by the reaction which occurs upon heat treatment. Without wishing to be bound by any theory, it is believed that this sweetening is attributed to the occurrence of the Maillard reaction. The sweetening of the cocoa powder is advantageous, since commensurably less sweetener may be added to the final chocolate composition. Typical sweeteners have a caloric value of approximately 4

Kcal per gram. The Maillard-sweetened cocoa powder has a caloric value of only about 2–2.5 Kcal per gram. Thus, it may be appreciated that any reduction in the amount of added sweetener in favor of the lower calorie Maillard-sweetened cocoa powder will result in a net reduction of calories in the finished chocolate product. In this manner, the caloric content of the final chocolate composition may be reduced by as much as about 25% below that of conventional chocolate, without the need for including taste-distracting and taste-damaging fillers which might deteriorate upon storage. The sweetening of the cocoa powder through the Maillard reaction with lactose allows the use of larger amounts of cocoa powder in the composition without the accompanying bitter taste of cocoa powder.

Moreover, it is believed that as much as 3–5%, and perhaps as much as 10%, of the Maillard reaction product exists in the form of a molecule having reduced absorbability by the body. This contributes to a further reduction in the caloric content of the final chocolate composition. It has been previously demonstrated that products of the Maillard reaction are not readily absorbed by the body.

It is believed that the Maillard reaction also contributes to reducing the allergenicity of the chocolate product. Lactose bonding with any dairy protein surviving ultra filtration in the dairy permeate, and lactose bonding with the protein component of the defatted cocoa powder, is believed to contribute to overall reduction of protein allergenicity of the resulting chocolate product. Lactose reduction of up to 70% has been achieved. Without wishing to be bound by any theory, it is believed that the shape of the complex molecules which form according to the Maillard reaction are less recognizable as allergens by the immune system than the corresponding noncomplexed proteins.

It is believed that the Maillard reaction also contributes to increasing the tolerance of migraine sufferers for the present composition. It is known that migraine is to some extent caused by sensitivity to the presence of certain biogenic primary amines in food, such as phenylethylamines. These same amines are available for reaction with sugars such as lactose via the Maillard reaction. The otherwise migraine-inducing amines are thus inactivated by conversion to Maillard reaction products. Furthermore, lactose is reduced up to 70%, which is a benefit to lactose-intolerant individuals.

Combining the defatted cocoa powder with the hypoallergenic dairy permeate either before or during drying of the latter has the further advantage of reducing the permeate drying time. The drying time may be reduced in this manner from an average of four hours to an average of one hour.

The fat component of the chocolate-style compositions may comprise any fat source suitable for human ingestion, which will provide a desirable mouth feel for the chocolate. The fat may be of animal, vegetable or cereal origin. The fat may be a seed fat or a grain fat. In particular, the fat component may comprise a vegetable- or cereal-derived hard butter, most preferably cocoa butter. Cocoa butter results from the defatting of cocoa powder. The fat component may alternatively comprise anhydrous milk fat cleared of any trace of protein by boiling in water, as is described in U.S. Pat. No. 5,112,636, incorporated herein by reference. The butter oil is pipetted off the water and used as the fat component in the chocolate composition. α-Tocopherol (vitamin E), in the amount of about 0.05% by weight, may be added as an antioxidant. In yet another embodiment, the fat may comprise a fat which has stability at room temperature (68–78° F.), which is necessary for the majority of cocoa butter products. In another embodiment, the fat may comprise a fat which is stable at extremes of temperature such as occurs in global shipment, warehouse storage, or display conditions that lack temperature control to room temperature. A fat system is employed which does not require tempering to enable the cocoa to withstand the melting, solidification and remelting without bloom (i.e., fat separation) normally associated with cocoa butter products. A fat system is employed such that the chocolate reglosses without the need for tempering, that is, it is capable of melting and resolidifying at about 70° F. without loss of its original glossy state.

The caloric content of the fat component, and therefore the caloric content of the finished chocolate composition, may be reduced by blending the fat with a reduced-calorie confectionery fat such as the confectionery fats described in U.S. Pat. No. 4,888,196. One such fat is caprocaprylobehenin, more commonly known as caprenin, which is a triglyceride of capric (C10), caprylic (C8) and behenic (C22) acid. The long-chain behenic component is only partially absorbed by the body. Most of it passes through the gastrointestinal system without contributing calories. Caprenin is a cocoa butter substitute, as the medium-chain capric and caprylic moieties help give caprenin cocoa butter-like melting characteristics. The combination of the free fatty acid moieties forming caprenin yields a caloric density of only 5 Kcal per gram, compared to 9 Kcal per gram for other dietary fats, such as cocoa butter.

While caprenin is recognized as a cocoa butter substitute to replace all or a portion of cocoa butter used in confectionery products, it has limited compatibility with cocoa butter. Thus, it has been recommended that confectionery compositions with caprenin should contain less than 10% cocoa butter. Otherwise, the resulting composition will have an undesirable softness. However, this limitation on the amount of cocoa butter combinable with caprenin may be circumvented by selecting a high-melting cocoa butter fraction. The high-melting butter fraction also has an antibloom effect. The fraction may be prepared according to the method of U.S. Pat. No. 5,112,636. For example, caprenin may be combined with equal parts by weight of a high melting point cocoa butter fraction prepared by heating cocoa butter to a temperature of about 120° F., following by chilling to about 84° F. The chilling temperature is maintained until crystal formation occurs in the cocoa butter. Crystallization can be greatly accelerated by seeding with pre-formed crystals, and/or by adding a high phosphatidylcholine-content lecithin. The liquid, which comprises primarily oleines, is decanted leaving a fraction comprised primarily of stearines. The stearines are characterized by a higher melting point and harder texture than oleines. The stearines can also be harvested by filtration, pressing or centrifugation.

Another family of low calorie fats is known as Salatrim (Smith et al., *J. Agricultural and Food Chemistry* 42, 432–34, 1994, incorporated herein by reference). Salatrim is a family of triacylglycerols produced by the interesterification of highly hydrogenated vegetable oils with triacyglycerols of acetic and/or propionic and/or butyric acids. Salatrim products provide the physical properties of fat but with approximately about half the calories (5/9) of a normal edible oil (Id.).

Low caloric density fats, milk fats, and confectionery fats may also be prepared as blends of available fats or preferably natural blends of fats not requiring chemical synthesis. Several embodiments of reduced fat chocolate composition may be reduced further in calories (from fat) by substituting varying percentages of a low-calorie density fat such as Salatrim, starting with as little as a few percent substitution. A nonsynthetic low caloric density blend which is equivalent to Salatrim may be prepared by blending lower calorie per mole triglyceride fats containing $C_2$, $C_4$, $C_6$, C8, $C_{10}$, and $C_{12}$ short and medium chain fatty acids with triglyceride fats containing $C_{16}$ and $C_{18}$ fatty acids. The resulting blend has a caloric density (5/9) similar to Salatrim and may be used as a confectionery fat. The fat from sheep's milk is a good source of low molecular weight fatty acids, the milk fat containing three-fold higher levels of shorter chain fatty acids than cow's milk. Also sheep's milk and its dairy products are much more hypoallegenic than goat's milk which, in turn, is more hypoallergenic than cow's milk. Goat's milk fat, having at least 3–5% butyric acid may also be used. These short chain fatty acid containing fats may be obtained by temperature fractionation and blended with enough stearic acid long chain fatty acid fats and blended with enough high melt high molecular weight compatible seed (for example soy derived seed, 1% level), or possibly a medium melt seed derived, for example, from palm oil; this blend results in a low calorie density confectionery fat ($C_4$ butyric acid has a molecular weight of 88, $C_6$ caproic acid has a molecular weight of 112, in contrast to high molecular weight $C_{16}$ palmitic acid with a molecular weight of 256 and stearic acid with a molecular weight of 284). As an example, Malaysian cocoa butter may be blended with fats containing low molecular weight fatty acids such as the commercially available Triacetin, Tributyrin, or Triproprionin, as well as medium and long chain fats to make a low or medium caloric density nutritional fat blend.

The reduced caloric density fats normally found in butter can also be blended. The most common molecular type in butter (5% of butter fat) is a triglyceride molecule with an average fatty acid weight of 12: 1–2 dipalmitoyl-3-butyrolyl-sn-glycerol (16:0, 16:0, 4:0). Similar blends may be made with vegetable oils such as soybean, cottonseed, soy-cottonseed, palm oil, Shea, or Illipe butter. Various degrees of hydrogenation can be used to increase hardness. Naturally occurring fat blends having reduced caloric density can be used in the food, especially confectionary, and pharmaceutical industries.

Preparations comprising cocoa butter stearine fractions are commercially available. One such product, "EQUATOR 75" cocoa butter, is available from Loders Croklaan, Lisle, Ill., a division of Van den Bergh Food Ingredients Group. It has a melting point of 36° C. (96.8° F.).

Some commercially available stearine fractions are prepared by solvent extraction of cocoa butter, such as by acetone extraction. It is desirable, however, that the final chocolate powder be completely free of even the most remote trace of solvent such as acetone, particularly when the product is being used by allergic individuals.

The hardness or softness of the fats used depends upon the length of the carbon chain and the degree of unsaturation of the fatty acid components, and can be controlled by the blending of fats. For example, fats can be softened by adding almond oil, or hardened by adding fat from nuts, e.g. shea, illipe, and cocoa butter. Hard fats may also be prepared by 5 micron filter straining (at six atmospheres of pressure) fats at varying temperatures (e.g. 80–90° F. for milk fat) in a hot room. Stainless steel mesh strainers have also been used, with the retentate being a source of hardened fat. Results using stainless steel mesh strainers are comparable to results using 5 micron filters and 6 atmospheres pressure. The use of Salatrim in conjunction with palm oil seed (138° F. melt) avoids the necessity to prepare a high melt Salatrim seed.

The fat component advantageously also includes at least one phospholipid as an emulsifier. While any amount of phospholipid may be included, an amount from about 0.1 to about 0.6 wt %, based upon the total weight of all components of the chocolate composition, is preferred. A most preferred amount is 0.6 wt %. The phospholipid will have viscosity and yield-reducing properties, without interfering with the functionality of the fat and the overall taste and mouth feel of the finished chocolate product.

When high phosphatidyl choline lecithin is included in chocolate products, peanut products, dairy products, or other foods, the total fat content can be reduced while maintaining the lubricity, viscosity, taste, texture, and industrial pumpability of higher fat foods. The fat content can be reduced even further by treating the food, or ingredients thereof, with liquid nitrogen or super critical $CO_2$, to increase the functionality of the fat. As an example, the fat content of peanut butter can be reduced by up to 25% or more by adding at least about ½% high phosphatidyl choline (at least about 32%) lecithin and by treating the peanut products with liquid nitrogen or super critical $CO_2$.

In the case of nuts, high phosphatidyl choline lecithin (0.5%) and glyceryl monooleate (0.05%) in five percent low specific gravity very permeable oil (such as apricot oil or almond oil) may be added to a batch of nuts to be defatted, and the mixture heated to 90° F., permitting the intrinsic fat in the nuts to be maximally functional at lower fat levels without the loss of texture of the nuts. It is also advantageous to warm the nuts to 140–155° F. in the presence of the highly permeable oil before adding the lecithin. The use of liquid nitrogen or super critical $CO_2$ can also make the fat more functionally available.

The phospholipid may comprise any phospholipid having fat-emulsifying properties. Such phospholipids useful as fat emulsifiers include, for example, phosphatidyl choline, phosphatidyl ethanolamine, phosphatidyl serine, and phosphatidyl inositol. The phospholipids are preferably derived from lecithin, preferably soy lecithin, which is conventionally used in chocolate products. Commercially available concentrated soy lecithin products useful in the practice of the present invention contain 35% or more phosphatidyl choline. The phospholipid may comprise up to 100% phosphatidyl choline.

It has also been unexpectedly discovered that cocoa butter which has been minimally or non-deodorized retains its own lecithin. A highly efficient natural cocoa butter lecithin was therefore extracted by a degumming process and found to significantly aid in the reduction of viscosity. This reduction in viscosity is particularly significant since it occurs over and above the effects of a full 0.5 to 0.6% dosage of high phosphatidyl choline soy lecithin, whereas additional soy lecithin phospholipids have generally been noted to have an opposite effect of increasing viscosity. In addition, when monoglycerol oleate is further added to cocoa butter lecithin an even further reduction in viscosity is noticed. When this equivalent further addition is made to the above soy lecithin an increase in viscosity is noticed. An increase in viscosity has also been observed upon the addition of rice oil or almond oil.

Cocoa butter lecithin has another commercial application in the food industry: soy derived lecithin is not permitted as Passover food ingredient, whereas cocoa butter and its products (including cocoa butter lecithin) are permitted.

The presence of the phospholipid emulsifier enhances the functionality of the fat component and thus allows one to utilize less fat in the composition than would otherwise be necessary to maintain an acceptable viscosity, yield structure and mouth feel for the finished chocolate composition. It is believed that incorporation with the phospholipid allows the amount of fat in the inventive composition to be reduced by at least about 4–6% over the 32% concentration of fat present in conventional chocolate compositions.

It has been unexpectedly discovered that phospholipid emulsifiers, and in particular phosphatidylcholine, can be used to enhance delivery to the oral mucosa, particularly the buccal and sublingual mucosa. While emulsifiers have been used to enhance skin penetration of pharmaceuticals, phosphatidylcholine has not previously been recognized for its ability to enhance drug absorption via the oral mucosa.

A vehicle comprising fat, wherein the fat includes a phospholipid (preferably from about 30 to about 100% by weight of phosphatidylcholine), can be used for the oral delivery, via oral (including sublingual and pharyngeal) mucosa contacted by prolonged taste savoring, of fat soluble medicaments such as acetylsalicylic acid and acetaminophen, and vitamins. The delivery of water soluble medicaments and vitamins can also be enhanced by high phosphatidyl choline phospholipids. A synergistic effect is obtained when the vehicle further comprises a low molecular weight (particularly containing $C_2$ fatty acid) and low caloric density fat such as Salatrim. The vehicle may further comprise a sweetener and cocoa powder which has been treated with a super critical fluid or critical liquid gas. Optionally a flavored oil, such as orange, cherry, or grape flavored oil is added at about 0.165 to 0.33%. The chocolate flavor and savoring effect encourages prolonged mouth retention of the taste and companion medication, vitamin, or mineral, and hence enhanced mouth absorption of same. The phospholipid further enhances penetration of the chocolate composition's flavor through the taste organs. The cell membranes of the taste buds and other bodies of the oral mucosa contain a phospholipid component which is readily penetrated by a phospholipid carrier. To encourage a melt away system, 1–2% almond oil, which is readily absorbable and miscible, is used to replace 1–2% of the confectionery vegetable fat (e.g. Salatrim). A partially hydrogenated low melt (76° F. melting point) soy fat can also be used to replace 5–10% of the vegetable fat in a melt away system. Coconut oil can also be used as a substitute for 5–10% of the vegetable fat.

The inventive chocolate composition may be utilized as a vehicle for delivery of oral medications, vitamins, and minerals, to mask drug flavor and provide for enhanced drug uptake via the oral mucosa. For example, a dosage form may be prepared by coating a medicament, vitamin, or mineral with a chocolate coating according to the present invention, or by mixing the medicament, vitamin, or mineral in liquid or powder form with the chocolate composition. The medicament, vitamin, or mineral is preferably added at the end of the conching process, at a mild temperature of about 100° to about 120° F. In some preferred embodiments the composition is preferably about 25 to 45 microns in size. A spherical size and shape, which are believed to aid in the absorption process, can be confirmed by microscopy. The 25 to 45 micron spherical particles are best formed in a beta crystalline fat system such as the confectionary fats which are primarily soy, soy cottonseed, tempered cocoa butter, palm, Shea or Illipe fat as well as lauric fats including cocoanut and palm kernel oil. In other preferred embodiments the composition comprises very fine alpha crystalline particles. Salatrim is the main confectionary fat having alpha crystals. Without wishing to be bound to a theory, it is believed that the spherical beta crystals and the very fine alpha crystals are absorbed in a manner similar to the chylomicrons formed in the intestinal tract.

A chewable tablet, e.g., aspirin tablet, may be thus formed. The drug may comprise any pharmaceutical suitable for oral delivery, in particular those drugs, such as dihydroergotamine (prescribed for migraine), which are difficult to deliver by the oral route on account of poor absorption. Since the chocolate vehicle is essentially hypoallergenic, it should not promote mucus production or migraine in sensitive individuals. It will thus not aggravate pre-existing health problems in these patients. Further health advantage obtains from the use of a non-sucrose sweetener, and from reduced fat content. This delivery system may also be used to enhance taste appreciation in populations having a reduced sense of taste, such as the elderly. The pleasant taste is comforting in itself, and also eliminates the apprehension and discomfort which accompanies delivery methods based on injection (subcutaneous, intravenous, intramuscular).

A further advantage to this oral mucosa delivery system is that the medicament, vitamin, or mineral is not subjected to the hostile environment in the stomach and intestines. In contrast, substances which are delivered by the traditional oral route (i.e., swallowing) are subjected to an environment that includes hydrochloric acid, enzymes such as pepsin in the stomach, bile acids and bile juices, pancreatic enzymes, the alkaline pH of the small intestine, and the bacterial content of the large intestine. The oral mucosal delivery route also protects the absorbed medication, vitamin, or mineral from 80 to 85 percent of hepatic breakdown/modification, since the systemic circulation sends only 15–20 percent of the medication, vitamin, or mineral to the liver, in contrast to the 80 to 85 percent which is sent to the liver after gastrointestinal processing and absorption through the portal vein to the liver.

Oral absorption according to the present invention can occur over a few (e.g. 1 to 3) minutes or over several (e.g. 15–20) minutes. Some absorption occurs immediately upon contact with the oral mucosa. Since the medicament, vitamin, or mineral is not subjected to the hostile portion of the digestive system, and is protected somewhat from hepatic breakdown/modification, decreased amounts of the active ingredient(s) can be used to achieve a therapeutic effect.

The oral mucosal contact includes the sublingual and pharyngeal mucosa, and the medicament, vitamin, or mineral is preferably delivered with directions to prolong the oral mucosal exposure by slow chewing and savoring of the flavored vehicle.

Aspirin as formulated in this enhanced rapid drug delivery system is thus quickly absorbable and offers a quick acting antiplatelet, anticoagulant activity for the emergency care of a myocardial infarction en route to the hospital.

Also advantageous is a multivitamin, where the rapid drug delivery system can deliver vitamin C to a respiratory tract infection, and can deliver vitamins to patients suffering from excessive diarrheal losses, poor uptake and absorption due to gastrointestinal diseases such as ileitis, regional enteritis, Crohn's disease, ulcerative colitis, mucous colitis, irritable bowel syndrome, or Celiac disease.

The chocolate composition according to the present invention may be used as a coating for cough drops, or a cough drop may be formed by mixing the active agent with the chocolate and forming the mixture into appropriately sized cough drops. The mixture may further contain natural peppermint, which is a source of natural menthol. The mixture may be blended with a hard candy lozenge. In all of these formulations, the phospholipid advantageously has a high phosphatidyl choline content, preferably from about 35 to about 100% by weight of the phospholipid component. The active agent for a cough drop may comprise, for example, a combination of an antitussive and an expectorant (mucus thinner), such as a mixture of dextromethorphan or salt thereof, and guaifenesin (glyceryl guaiacolate). For example, the active agent may comprise 5 mg dextromethorphan and 50 mg guaifenesin.

A further reduction in the amount of fat is possible if the chocolate mass particles which form in the composition are processed to an increased size. While particles found in conventional chocolates average about 10 microns in size, the particles in the composition of the present invention are processed to an average size in the range of from about 20 to about 30 microns, preferably from about 20 to about 25 microns. A particle size in this range may be achieved by controlling the degree to which the composition is rolled or refined following combination of all the ingredients.

The components of the chocolate composition are combined to form a paste. The desired size is achieved by controlling the amount by which the paste is rolled. While conventional chocolate is typically rolled to a particle size of 10 microns, the present composition is rolled only until the particle size is reduce to 20–25 microns, preferably to about 25 microns. It is believed that by increasing the particle size of the present composition, less fat is required to retain the desired mouth feel and other characteristics of chocolate. Accordingly, maintaining a large particle size permits a fat reduction of about 4% below the fat level of conventional chocolate compositions, while still maintaining the viscosity, yield structure and mouth feel characteristic of conventional chocolate.

It may thus be appreciated that while conventional chocolate contains a fat content of approximately 32%, the foregoing fat-reducing strategy has provided a reduction in fat content in the inventive composition of about 8–10% or more from the typical 32–33% level for chocolate, resulting in an overall fat content for the finished inventive composition of 22–25%, or less.

According to one embodiment of the invention, the fat component for use in the chocolate compositions of the invention may be first prepared as a modular or "structured" fat component which is then combined with the remaining components of the formulation. For example, for low-fat remoldable or non-tempering chocolates, the fat component may advantageously comprise a fat mixture A consisting of 1.4% high phosphatidylcholine-content lecithin, 2.0% clarified anhydrous milk fat stearine fraction containing 0–5% α-tocopherol, and 96.6% fractionated hydrogenated palm kernel oil or Kaopreme. In variations of fat mixture A, the phosphatidylcholine amount may be increased to as high as 10%. Also, clarification of the anhydrous milk fat stearine fraction may be omitted when milk allergy is not an issue. For reduced fat and calorie chocolate product formulations, a fat mixture B may be employed consisting of 1.4% high phosphatidylcholine-content lecithin, 2.0% clarified anhydrous milk fat stearine fraction containing 0.05% α-tocopherol, 48.3% Malaysian cocoa butter stearine fraction, and 48.3% caprenin. According to one variation, fractionated hydrogenated palm kernel oil is substituted for Malaysian cocoa butter stearine fraction. A fat component for low fat chocolate compositions may comprise a fat mixture C consisting of 1.4% high phosphatidylcholine-content lecithin, 2.0% clarified anhydrous milk fat stearine fraction containing 0.05% α-tocopherol, and 95.2% West African cocoa butter. Variants of fat mixture C include mixtures wherein the phosphatidylcholine content ranges up to 10%. The fats are liquified to a temperature of 100–120° F. and manually mixed with a spatula, or mixed automatically with an in-line mixing device. The remainder of the high phosphatidyl choline lecithin, up to 0.7% of the final chocolate product, is added late in the conching stage.

Additionally, chocolate coatings may be prepared according to the present invention which conform to the standards of identity for authentic chocolate by including at least 10% chocolate liquor. Accordingly, a liquid nitrogen-treated chocolate liquor, conforming to these standards of identity, may be included in the chocolate compositions of the invention. The chocolate composition may comprise from about 0.5 to about 75% liquid nitrogen-treated chocolate liquor, more preferably from about 5 to about 40%, most preferably from about 10 to about 20%. Compositions containing at least 10% chocolate liquor conform to the standards of identity for chocolate. Nitrogen-treated chocolate liquor is no longer commercially available, but may be prepared as described below. The use of such chocolate liquors allows the preparation of chocolate compositions having a fat content of only about 24%, while still complying with the standards of identity for chocolate.

According to one preferred embodiment, a Standard of Identity, reduced fat chocolate composition is prepared by combining super critical $CO_2$-defatted cocoa powder, a non-fat milk powder, sweetener, cocoa butter, liquid nitrogen-treated chocolate liquor, and a fat mixture H consisting of 16.8% anhydrous milk fat, stearine fraction, 9.0% anhydrous milk fat, 72.2% cocoa butter and 1.3% lecithin.

The various compositions of the present invention preferably contain a sweetener component. Any acceptable sweetener or combination of sweeteners may be used. The sweetener may comprise sucrose or other sugars, or a synthetic sweetener such as saccharin, aspartame, acesulfame-K or other high intensity sweetener. The sweetener may also comprise an anhydrous polyol sweeteners, which is preferred. The polyols are derived from sugars. The hydrogenation process transforms the reactive reducing end of the sugar molecule into a relatively nonreactive hydroxyl group. This is the chemical change that defines the difference between a sugar and a polyol. Polyols which find use as sweeteners according to the present invention include maltitol, mannitol, xylitol, sorbitol, lactitol and combinations thereof. Of these, maltitol is preferred as it has much less laxative effect than the most commonly used sweetener, sorbitol. Also, maltitol lacks the coarse grain of sorbitol. According to one embodiment, sorbitol and maltitol are combined, preferably in approximately equal weight amounts. The need for a sweetener is, however, reduced by virtue of the sweetening effect of the Maillard-sweetened cocoa powder. This is advantageous from the point of view of reducing calories since the Maillard-sweetened cocoa powder has a caloric content of only 2–2.5 Kcal per gram, compared to 4 Kcal per gram for the typical sweetener.

The sweetener component may be selected so as to provide a reduced calorie product. For example, one gram of dextrose may be combined with 40 milligrams of saccharin.

The sweetener may be present in from about a trace amount to up to about 75% of the composition. By "trace amount" means just a few milligrams, or possibly smaller amount of sweetener in, for example, a 5 gram piece of chocolate. Preferably, the chocolate is present in the amount at least about 0.5%.

The chocolate-style composition may further advantageously contain additional ingredients such as vitamins, additional flavorings, flavor enhancers, lecithin and other auxiliary agents suitable for use in confections. Vanilla is particularly useful as a flavor enhancer. The additional ingredients may preferably range up to 5% of the total composition.

For the preparation of hypoallergenic pastel compositions suitable as milk chocolate-style coating, cocoa powder is omitted. Such compositions thus contain from about 0.5 to about 60% fat, from about a trace amount to about 75% sweetener, and from about 10 to about 60% hypoallergenic dairy permeate. Preferably, the sweetener is present in an amount of at least about 0.5%.

The composition may further contain one or more nuts and/or grains suitable for inclusion in chocolate confections. The grains and nuts may advantageously range up to 50% of the total composition. Particularly useful grains are crisp rice and ground oat. Crisp rice is particularly well-tolerated by allergic individuals. Crisp rice provides a hypoallergenic product but with a nut crunch effect. Almond is the most preferred nut, as it has the lowest allergenic potential of all nuts, particularly when defatted. The nuts may be whole or chopped, or substantially ground to flour as in the case of peanut flour. Partially defatted peanut flour (11% fat) is particularly preferred. The partially defatted peanut flour may be more completely defatted by treatment with supercritical $CO_2$. As with super critical fluid treatment of the cocoa powder, defatting treatment of the peanut flour will enhance its hypo allergenicity. Treatment with super critical fluid or critical liquid gas may also be performed without defatting, resulting in a hypoallergenic product having fat with enhanced functionality (increased availability) so that less total fat is required in the final product.

The hypoallergenic chocolate is formed by combining the ingredients of the composition into a paste, except any grains or nuts. Preferably, the hypoallergenic cocoa powder and dairy permeate are combined prior to pasteurization, or before or during drying of the permeate, as described above. The paste is refined to reduce particle size to 20–30 microns, preferably 20–25 microns, by passage over rollers. The mixture is stirred under heat as in conventional chocolate making processes to form solid chocolate. For the preparation of pastel confection coating compositions, the cocoa powder is omitted. The mixture is then conched by continuous stirring at a temperature of from about 90° to about 200° F., preferably from about 135° to about 160° F., for from about 10 minutes to about 76 hours, preferably from about 12 to about 48 hours. The stirring speed is any stirring speed suitable for chocolate making, such as 1 revolution for 3 seconds. The prolonged conching enhances the flavor and palatability of the composition. The coarse grains or nuts such as whole or chopped grains or nuts are added to the stirred mixture, before solidification of the mixture. Finer grain or nut additives, such as grain or nuts which have been ground to a flour, may be added to the composition prior to refining and conching.

The grains and nuts, particularly the nuts, are preferably partially or completely defatted and then conched by heat treatment as above with the chocolate composition. This will render them hypoallergenic, if the particular grain or nut has allergenic potential. The chocolate composition is then tempered, i.e. chilled, to bring about solidification, according to conventional chocolate-making techniques.

A moldable chocolate may be prepared by selecting a fat which has stability warmer than at room temperature (68–78° F.) as the fat component. By "stability" is meant that the fat is substantially solid, i.e., greater than 50% is in a solid state. Certain vegetable or cereal fats are stable at room temperature. Moldable chocolate compositions are not tempered. The chocolate may be in the form of discs. The moldable chocolate according to the invention may be easily molded into desired shapes, with a minimum of skill. It may therefore be used by hobbyists and other amateur confectioners. Moldable compositions may be shipped in warm weather without the need for cold packs or refrigerated trucks, since retention of a particular finished shape is not a concern. Alternatively, moldable compositions may be molded prior to warm weather shipment in plastic molds sealed with plastic. Upon arrival, the molded chocolate may be refrigerated for 5 to 10 minutes to restore a solid consistency. Because the mixture contains only little, if any, allergenic protein from the optional dairy permeate component, the heat processing has the additional advantage in contributing to the denaturation of that remaining protein. Thus, the conching may further improve the hypo allergenicity of the chocolate product. In particular, the residual protein remaining after ultra filtration comprises lactalbumin predominately. Lactalbumin is the most sensitive of the allergenic proteins to heat denaturation.

The prolonged conching, which contributes to the formation of a complex between the dairy permeated component and the cocoa powder, also serves to reduce the migraine-inducing potential of the inventive chocolate. The heat treatment is likely to cause phenylethylamine, the primary amine which is an important suspect in causing migraine, to combine with reducing sugars in chocolate. In the case of milk chocolate, lactose from the dairy permeate component may combine with the phenylethylamine to form a migraine-inactive complex. The heat treatment also very likely converts phenolic compounds and catechin in the chocolate to an amorphous insoluble polymerized mass. In this state, these compounds are inactive in triggering migraine. Super critical fluid or critical liquid gas treatment of food ingredients may therefore be used to form reduced calorie and reduced lactose compositions as well as to enhance tolerance by the migraine patient population. The prolonged heat treatment may possibly also serve to sublimate theobromine and thereby reduce its concentration. Theobromine is a suspected migraine-inducing compound found in cocoa, although it is probably much less of a migraine-inducing agent than phenylethylamine.

Furthermore, the substitution of other sweeteners for sucrose, the natural sweetener ordinarily present in conventional chocolate, serves also to reduce the potential for migraine. Ingestion of concentrated sucrose after fasting has been observed to cause migraine in susceptible individuals.

The resulting chocolate or chocolate-style compositions are essentially hypoallergenic since the protein-containing components have been rendered hypoallergenic by processing or protein removal. The product is well tolerated by allergic patients.

The defatted, hypoallergenic cocoa powder may also be used as a flavoring for beverages. In particular, it may be used to flavor sports drinks, electrolyte replacement beverages, medicinal feedings such as enteral feeding compositions, and other beverages. In particular, the defatted, hypoallergenic cocoa powder may be used to improve the taste of elemental enteral feeding compositions, such as feeding compositions comprising a mixture of amino acids, and soy bean beverages. The cocoa powder may be combined with dairy permeate to form a flavoring for beverages, as described elsewhere herein.

The defatted, hypoallergenic cocoa powder may be combined with a sugar or sugar substitute and/or an appropriate oil, e.g., soy oil, to form a soy beverage. Other oils having hypoallergenic characteristics, e.g., rice bran oil or palm kernel oil, may be substituted.

The practice of the invention is illustrated by the following non-limiting examples. In certain of the examples, a sufficient amount of fat is added with the other components to provide a creamy mixture having a particle size in the range of 20 to 25 microns, and a pasty consistency which when further refined by passage over rollers will provide a creamy consistency. The remainder of the fat content is added upon conching.

According to one preferred embodiment of the invention, the total fat content of the composition is not more than about 29% by weight, more preferably not more than about 25%, most preferably in the range of 20–24%. A fat content of 24% is particularly preferred. A total fat content of 29% is less than the typical chocolate fat content of 33%. The products having a fat content of only 24% to 25% have only ¾ the fat content of conventional chocolate, without disturbing the taste. Notwithstanding this significant fat reduction, the chocolate compositions of the present invention maintain the mouth feel of conventional chocolate.

Milk is 12% solids, of which approximately one third is protein, one third is fat, and one third is lactose and minerals. The dairy permeate used in the practice of the present invention has the natural fat content removed. In the following examples, the dried dairy permeate is combined with fat such that the fat load in the permeate powder is zero, or merely about 3–5% when reconstituted with hypoallergenic milk fat. According to one embodiment, a fat content of as low as 3% was obtained. Notwithstanding this reduction in fat content from the 33% fat content of conventional milk solids, the inventive milk chocolate or chocolate-style compositions maintain the desirable mouth feel of conventional milk chocolate.

In addition to a sharply reduced fat content, the compositions according to the present invention are characterized by a substantially reduced caloric content in comparison to conventional chocolate products. The products of the invention are characterized by caloric contents per 100 grams of less than 500 Kcal, in some cases less than 450 Kcal, in other cases less than 400 Kcal, and in some cases even as low as 350 Kcal or less.

The products of the present invention, due to their reduced fat and calorie content, are appropriate not just for chocolate-allergic individuals, but for all those who seek to enjoy the good taste of chocolate while maintaining a diet of reduced fat and reduced calories.

The products of each of the non-prophetic examples were ingested by a milk- and chocolate-allergic female patient, without any intolerance. The patient, who manifests migraine headache and gastrointestinal bleeding upon ingestion of even small amounts of chocolate, was observed to tolerate all products sampled. The patient is the most reactive of more than 100 chocolate-sensitive patients under clinical surveillance. Her gastrointestinal bleeding occurs within 12–24 hours of ingestion of commercial chocolate. Migraine occurs within 12–24 hours when challenged with chocolate. The symptoms have been noted to occur in this patient on more than 30 occasions.

The super critical $CO_2$ and liquid nitrogen treated hypoallergenic products of the present invention are useful in a wide variety of food, nutrition, and medical market applications. Food from the G.I. tract is converted by the body into circulating lipoprotein particles which are similar to the particles made in chocolate manufacturing. Although a protective blanket of mucus or mucin in the gastrointestinal tract generally prevents intact protein from entering the blood stream, disease or deficiency may permit non-digested protein allergens (especially in combination with fat) to readily enter the blood stream and sensitize the immune system to foreign protein, leading to allergic sensitization and subsequent allergic reaction. Disease or deficiency can occur because of G.I. virus, enteropathy (Regional Ileitis, Crohn's Disease, Ulcerative Colitis), or premature, delicate, or otherwise less intact membranes such as the G.I. surface membranes of newborns and infants. It is believed that foods processed according to the invention may be advantageously incorporated into the diets of persons suffering from any of these diseases or deficiencies.

The following nonlimiting examples exemplify the practice of the invention.

EXAMPLE I

Five grams of super critical $CO_2$-treated cocoa powder was alkalized and mixed with a 6-ounce vanilla-flavored soda containing citric acid. On stirring, the release of $CO_2$ generated from the reaction of $K_2CO_3$ with the citric acid in the soda led to the dispersion of the cocoa powder. The drink may thus serve as an instant "soda fountain" chocolate soda. Prepared with a sugar substitute such as aspartame or saccharin, the beverage may serve as a low-calorie diet soda, which is 99.99% fat-free. The beverage was well tolerated by the female allergic patient.

EXAMPLE Ia

Five grams of super critical $CO_2$-treated cocoa powder was alkalized and mixed with 6 ounces of hot water and sweetened with 1 gram of dextrose and 40 mg of saccharin. The beverage was served as a reduced-calorie, hypoallergenic hot chocolate, which was in excess of 99% fat free. The beverage was well tolerated by the female allergic patient.

EXAMPLE II

Alkalized cocoa powder is prepared by heating ground nibs of roasted cocoa beans at temperatures of 215–300° F. and pressures of 6,000–8,000 psi for min. The powder is treated with super critical $CO_2$, resulting in at least 99.5% fat-free cocoa. A hypoallergenic chocolate composition is prepared by mixing 7.0% wt % of the defatted cocoa powder, sufficient cocoa butter to obtain a creamy consistency, 63.0 wt % sucrose, 0.4% lecithin and 0.1% natural vanilla. The mixture is then refined to a 25 micron particle size and then conched by heating for two hours at 145–180° F., while additional cocoa butter is added to bring the cocoa butter total weight up to 29.5%. The mixture is then cooled. Chocolate bars are prepared from the composition.

EXAMPLE III

Chocolate according to Example II is prepared, except that maltitol is substituted for sucrose to form a sugar-free chocolate composition.

EXAMPLE IV

A hypoallergenic milk chocolate is prepared by combining 11% dry weight of a hypoallergenic milk prepared by ultra filtration of casein-free sweet whey according to Example 16 of U.S. Pat. No. 5,064,674, 7% hypoallergenic defatted cocoa powder, 43% sucrose, 38.5% cocoa butter, 0.4% lecithin, and 0.1% natural vanilla.

EXAMPLE V

Chocolate according to Example IV is prepared, except that maltitol is substituted for sucrose to form a sugar-free chocolate composition.

EXAMPLE VI

A hypoallergenic milk chocolate was prepared by combining 20% weight of a hypoallergenic milk prepared by ultra filtration of casein-free sweet whey according to Example 16 of U.S. Pat. No. 5,064,674, 8% hypoallergenic super critical $CO_2$-defatted cocoa power (99.99% fat free), 38.5% sucrose, 27% cocoa butter, 6% hypoallergenic butter fat prepared in accordance with U.S. Pat. No. 5,064,674 (plus 0.05% α-tocopherol), 0.4% lecithin, and 0.1% natural vanilla. The mixture was conched 48 hours, tempered and molded into small bars. The bars were well tolerated by a chocolate and milk allergic individual.

EXAMPLE VII

Hypoallergenic butter fat was prepared by triple washing of anhydrous milk fat (99.99% pure, 0.01% moisture) in boiling distilled water (5 L boiling water per 20 grams milk fat). To the washed, now hypoallergenic butterfat was added 500 ppm (i.e., 0.05%) of α-tocopherol (vitamin E). Whey diluted 20% with spring water during the cheese making process was filtered through a tubular spiral wound membrane ultra filter (0.01μ pore size). The permeate (pH 6.6) was immediately batch pasteurized at 145° F. for 30 minutes, followed by refrigeration. The permeate was dried into a powder (4% moisture) by spray drying in a spray drying oven. Three-ounce chocolate bars were prepared by mixing the following ingredients in the following weight percentages:

| | |
|---|---|
| Super critical $CO_2$-defatted cocoa powder (99.95% fat free) | 7.0 |
| Hypoallergenic whey permeate powder | 21.5 |
| Hypoallergenic butterfat (containing 0.05% vitamin E) | 3.5 |
| Lecithin | 0.3 |
| Natural vanilla | 0.1 |
| Cocoa butter | 26.5 |
| Maltitol | 41.1 |

The ingredients were mixed thoroughly, conched by heating for 36 hours at 145–155° F., at a stirring speed of one revolution per 10 seconds. The composition was then tempered and formed into 5 gram squares which had the taste and appearance of milk chocolate. The milk chocolate was well tolerated by a chocolate and milk allergic patient.

EXAMPLE VIII

Example VII was repeated with the following ingredients in the following weight percentages:

| | |
|---|---|
| Super critical $CO_2$-defatted cocoa powder (99.99% fat free) | 7.0 |
| Hypoall. whey permeate powder | 11.4 |
| Hypoallergenic butterfat (containing 0.05% vitamin E) | 0.6 |
| Lecithin | 0.4 |
| Natural vanilla | 0.1 |
| Cocoa butter | 28.4 |
| Maltitol | 52.1 |

The ingredients were mixed thoroughly and conched by heat for 36 hours at 145–155° F., at a stirring speed of one revolution per 10 seconds. Crisp rice was then added to a total rice loading of 4 wt. % The composition was then tempered and formed into 5 gram squares which had the taste and appearance of milk chocolate. The squares were well tolerated by a chocolate and milk allergic individual.

EXAMPLE VIIIa

Example VIII was repeated, with the addition of 5% partially defatted peanut flour. Maltitol was adjusted to 47.1%. The mixture was conched for 28 hours. The 5 gram squares were well tolerated by a chocolate and milk allergic individual.

EXAMPLE IX

Example VII was repeated with the following ingredients in the following weight percentages:

| | |
|---|---|
| Super critical $CO_2$-defatted cocoa powder (99.99% fat free) | 7.0 |
| Hypoall. whey permeate powder | 20.0 |
| Hypoallergenic butterfat (containing 0.05% vit. E) | 0.6 |
| Lecithin | 0.4 |
| Natural vanilla | 0.1 |
| Cocoa butter | 28.4 |
| Maltitol | 39.5 |
| Partially defatted peanut flour | 4.0 |

The ingredients were mixed thoroughly and heated for 36 hours at 145° F., at a stirring speed of one revolution per 10 seconds. Crisp rice was then added to a total rice loading of 4 wt. % The composition was then tempered and formed into 5 gram squares which had the taste and appearance of milk chocolate. The squares were as well tolerated by the chocolate and milk allergic individual, and had the good taste and appearance of milk chocolate.

EXAMPLE X

Example VII was repeated with the following ingredients in the following weight percentages:

| | |
|---|---|
| Super critical $CO_2$-defatted cocoa powder (99.99% fat free) | 7.0 |
| Hypoall. whey permeate powder (containing 0.05% vit. E) | 24.0 |
| Hypoallergenic butterfat | 1.2 |
| Lecithin | 0.4 |
| Natural vanilla | 0.1 |
| Cocoa butter | 28.4 |
| Maltitol | 38.9 |

The ingredients were mixed thoroughly and conched by heating for 36 hours at 145–155° F., at a stirring speed of one revolution per 10 seconds. Crisp rice was then added to a total rice loading of 4 wt. % The composition was then tempered and formed into 4 gram squares which had the taste and appearance of milk chocolate. The squares were well tolerated by the allergic patient.

EXAMPLE XI

A hypoallergenic pastel confection coating ("white chocolate") is prepared according to Example VIII except that the cocoa powder was omitted, and the amount of maltitol is increased to 59.1%.

EXAMPLE XII

A hypoallergenic confection is prepared according to Example VIII except that the cocoa and whey permeate powder are omitted, and the amount of maltitol is increased to 70.5%.

EXAMPLE XIII

A moldable hypoallergenic chocolate, not requiring tempering or retempering after melting, was prepared by mixing the following ingredients, followed by heating for 36 hours at 145° F., at a stirring speed of one revolution per 10 seconds.

| | |
|---|---|
| Super critical $CO_2$-defatted cocoa powder | 7.0 |
| Hypoall. whey permeate powder (containing 0.05% vit. E) | 11.4 |
| Hypoallergenic butter fat | 0.6 |
| Lecithin | 0.4 |
| Natural vanilla | 0.1 |
| Maltitol | 48.1 |
| Thermally stable hydrogenated palm kernel oil | 28.4 |

The resulting chocolate was prepared as multiple wafer discs, melted in a double boiler for 5 minutes at 130° F. and then poured into a mold and allowed to cool in a refrigerator for 5–10 minutes. The molded squares were tolerated by a chocolate and milk allergic individual, and had the good taste and appearance of milk chocolate.

EXAMPLE XIIIa

A sugar-free moldable chocolate, hypoallergenic as to its cocoa component but not its diary component, is prepared by substituting a commercially available dairy protein concentrate (milk protein concentrate, 4% lactose; whey permeate concentrate, 4% lactose; or sodium or potassium caseinate) for the hypoallergenic whey permeate powder of Example XIII. The composition is characterized by a reduced lactose content, to provide an essentially "sugar free" (i.e., no more than 0.5 wt % sugar) chocolate product.

EXAMPLE XIV

A hypoallergenic cocoa-flavored powder useful for flavoring beverages was prepared as follows. The following ingredients were combined and formed with warming into a paste:

| | |
|---|---|
| Cocoa butter | 15 grams |
| Super critical $CO_2$-defatted cocoa powder | 135 grams |
| Refined soybean oil | 150 grams |
| Sucrose | 700 grams |
| Lecithin | 4 grams |
| Natural vanilla | 1 gram |

The paste was refined over refining rolls pressurized to a 350–450 Psi squeeze pressure to form a powdery ground matrix useful as a powdered chocolate flavoring.

EXAMPLE XIVa

Two to three teaspoons of the powder prepared according to Example XIV are added with stirring to six to eight ounce glasses containing soybean beverage (commercially available milk substitute) to form a chocolate-flavored hypoallergenic beverage.

EXAMPLE XIVb

Example XIV was repeated except 700 grams of maltitol was substituted for sucrose to make a sugar-free hypoallergenic cocoa-flavored powder for use in flavoring the beverage.

EXAMPLE XV

The following ingredients are combined and mixed well to form a hypoallergenic chocolate syrup:

| | |
|---|---|
| Super critical $CO_2$-defatted cocoa powder | 178 grams |
| Cocoa butter | 22 grams |
| Fructose | 250 grams |
| Sucrose | 350 grams |
| Water | 250 grams |
| Natural vanilla | 2.5 grams |
| Potassium sorbitate | 1.0 grams |
| Sodium chloride | 0.5 grams |
| Carrageenan | 0.5 grams |

EXAMPLE XVI

A hypoallergenic powdered chocolate flavoring is prepared as in Example XIV, except that a mixture of maltitol and xylitol is substituted for the sucrose.

EXAMPLE XVII

A hypoallergenic powdered chocolate flavoring is prepared as in Example XIV, except that 110 grams of sucrose is substituted with 110 grams of a dried powder of a hypoallergenic whey permeate, such as the whey permeate powder prepared according to Example 16 of U.S. Pat. No. 5,064,674.

EXAMPLE XVIIa

Example XVIII is repeated increasing the amount of milk permeate powder to 200 grams.

EXAMPLE XVIII

A moldable hypoallergenic chocolate not requiring tempering or retempering was prepared and molded according to Example XIII and poured into plastic trays accommodating 28 one inch squares of chocolate. After chilling in the refrigerator for ten minutes, the trays were covered with plastic, sealed and shipped from Florida to Pennsylvania via ordinary mail in 90° F. weather, without a cold pack or refrigeration. Upon arrival 3 days later the chocolate was found to be in molded form, with its chocolate sheen intact. Its appearance and taste were good, unlike conventional chocolate which being sent under similar conditions would have arrived soft, melted and unformed. Conventional chocolate would have arrived with a white discoloration indicative of bloom, i.e., fat separation. The chocolate was tolerated by the chocolate and milk allergic subject.

EXAMPLE XIX 883 lbs of liquid hypoallergenic whey permeate (corresponding to about 100 lbs of hypoallergenic whey permeate powder, based upon a 12% solids determination by refractometry of the liquid) was placed in a container immediately upon collection. To this was added 60 lbs of super critical $CO_2$-defatted cocoa powder (99.99% fat free). The pH of the permeate was observed to increase from 6.2 to 6.6 upon addition of the cocoa powder. The mixture was batch-pasteurized at 145° F. for 2.5 hrs. The mixture was sampled periodically for taste. A change in flavor was noted after the first hour. The mixture became progressively sweeter in taste. After two hours, the bitter taste characteristic of cocoa was absent. The mixture was subsequently dried into a powder by drying in a spray drying oven. Whereas complete drying (to 4% moisture) of whey permeate alone requires four hours, the whey permeate/cocoa powder mixture was dried in only one h our.

EXAMPLE XIXa

Example XIX was repeated except that the whey permeate was batch pasteurized at 145° F. for 30 minutes before addition of cocoa powder and then for another 30 minutes after addition of the cocoa powder.

EXAMPLE XIXb

Example XIXa was repeated, except that the ratio of whey permeate (based upon dry weight) to cocoa powder was decreased from about 5:3 to about 1:1. The pH of the permeate increased from 6.2 to 7.0.

EXAMPLE XIXc

Example XIXa was repeated, except that the ratio of whey permeate (based upon dry weight) to cocoa powder was decreased from about 5:3 to about 18:25. The pH of the permeate increased to pH 7.2.

The Example XIXa, XIXb and XIXc products displayed an increased sweetness over the flavor of the separate cocoa component. On a subjective scale, the Example XIXa and XIXb products were approximately four times sweeter than the cocoa powder alone, while the XIXc product was only two times sweeter. Drying time was also accelerated four-fold, as in Example XIX (from four hours to one hour).

EXAMPLE XX

A hypoallergenic chocolate having a fat content of 25% and caloric content of 457.9 Kcal per 100 grams was prepared by mixing the ingredients listed below in the indicated weight percentages. The lecithin comprised soy bean lecithin containing 35% phosphatidyl choline.

The hypoallergenic butter fat and deodorized Malaysian cocoa butter constitute stearine fractions were prepared by separately heating hypoallergenic butter fat or deodorized Malaysian cocoa butter to a temperature of about 120° F., followed by chilling to about 84° F. The chilling temperature was maintained until crystal formation occurs. The resulting liquid was poured off, leaving a high melting point fraction comprised primarily of stearines ("stearine fraction"). The ingredients of the chocolate composition were mixed thoroughly into a paste. The paste was refined to a particle size of 25 microns by passage over rollers. The paste was conched by heating for 36 hours at 145–155° F., at a stirring speed of one revolution per 10 seconds. The composition was then tempered and formed into about 5 gram chocolate squares.

|  | Wt % | Kcal/g | Kcal/100 g of chocolate |
|---|---|---|---|
| Super critical $CO_2$-defatted cocoa powder (99.99% fat free) | 7.0 | 1.6 | 11.20 |
| Hypoall. whey permeate | 11.4 | 4.0 | 45.60 |
| Hypoall. butter fat (stearine fraction) | 0.6 | 9.0 | 5.40 |
| Soy lecithin (35% phosphatidyl choline) | 0.5 | 7.0 | 3.50 |
| Natural vanilla | 0.1 | 4.0 | 0.40 |
| Deodorized Malaysian cocoa butter (stearine fraction) | 12.2 | 9.0 | 109.8 |
| Caprenin | 12.2 | 5.0 | 61.0 |
| Maltitol | 56.0 | 4.0 | 224.0 |
| Total: | 100.00 |  | 460.9 |

EXAMPLE XXa

Example XX is repeated except as follows. The hypoallergenic whey permeate is substituted with an identical amount of milk or whey protein concentrate (containing 4% lactose), calcium caseinate or sodium caseinate. This sharply limits the presence of any sugar, e.g., lactose, which may be otherwise supplied through the hypoallergenic whey permeate. If a 60% whey protein concentrate (40% lactose containing mineral salts) is employed, allergenicity may be reduced by first batch pasteurizing a pre-mixture of the 6-% whey protein concentrate in liquid form and cocoa powder for 30 minutes, followed by spray drying.

EXAMPLE XXI

A hypoallergenic dark chocolate formulation useful as a coating and having a 28% fat content was prepared as a 300 lb factory run by mixing the following ingredients into a paste, followed by conching, stirring and tempering as in the previous example:

|  | Wt % | Kcal/g | Kcal/100 g of chocolate |
|---|---|---|---|
| Super critical $CO_2$-defatted cocoa powder (99.99% fat free) | 21.2 | 1.6 | 33.6 |
| Lecithin | 0.4 | 7.0 | 2.8 |
| Natural vanilla | 0.1 | 4.0 | 0.4 |
| Cocoa butter | 28.0 | 9.0 | 252.0 |
| Maltitol | 50.3 | 4.0 | 201.2 |
| Total: | 100 | 4.0 | 490.0 |

The formulation was tolerated by a chocolate-allergic patient without gastrointestinal bleeding and migraine usually noted upon consumption of commercial chocolate by this individual. The composition may be used as a coating to enrobe a variety of products such as confections, grain mixtures, frozen hypoallergenic dairy products such as hypoallergenic ice cream (upon changing the fat to a hypoallergenic oil, e.g., rice oil), and pharmaceutical dosage forms.

EXAMPLE XXII

A milk chocolate formulation having a 24% fat content, useful as a coating, is prepared in a 3,000–6,000 lb batch according to the procedure of the previous example, from the following ingredients:

|  | Wt % | Kcal/g | Kcal/100 g of chocolate |
|---|---|---|---|
| Super critical CO$_2$-defatted cocoa powder (99.99% fat free) | 7.0 | 1.6 | 11.20 |
| Hypoall. whey permeate | 11.4 | 4.0 | 45.60 |
| Hypoall. butter fat | 0.6 | 9.0 | 5.40 |
| Soy lecithin | 0.6 | 7.0 | 4.20 |
| Natural vanilla | 0.1 | 4.0 | 0.40 |
| Cocoa Butter | 23.4 | 9.0 | 210.6 |
| Maltitol | 56.9 | 4.0 | 224.0 |
| Total | 100 |  | 498.2 |

EXAMPLE XXIIa

Example XXII is repeated, with the same modifications as in Examples XXa.

EXAMPLE XXIIb

Example XXII is repeated except that the fats (butter fat, lecithin and cocoa butter) are first combined into a fat component mixture, which is then added to the remaining ingredients. The fat component is formed by melting the individual fats by heating to a temperature in the range of 100–120° F. The melted fats are mixed manually with a spatula, or are mixed automatically with an in-line mixing device.

EXAMPLE XXIII

A hypoallergenic milk chocolate having a 24% fat content is prepared according to the procedure of Example XXI. The whey permeate is batch pasteurized for 30 minutes, and then batch pasteurized again for another 30 minutes after addition of cocoa powder.

|  | Wt % | Kcal/g | Kcal/100 g of chocolate |
|---|---|---|---|
| Super critical CO$_2$-defatted cocoa powder (99.99% fat free) | 30.5 | 1.6 | 48.8 |
| Hypoall. whey permeate | 18.0 | 4.0 | 72.0 |
| Hypoall. butterfat (stearine fraction) | 0.6 | 4.0 | 2.40 |
| Soy lecithin (35% phosphatidyl choline) | 0.6 | 7.0 | 4.20 |
| Natural vanilla | 0.1 | 4.0 | 0.40 |
| Deodorized Malaysian cocoa butter (stearine fraction) | 23.4 | 9.0 | 210.68 |
| Maltitol | 26.7 | 4.0 | 106.8 |
| Total: | 100.0 |  | 445.3 |

EXAMPLE XXIIIa

Example XXIII is repeated except that the fats (butter fat, lecithin and cocoa butter) are first combined into a fat component mixture, which is then added to the remaining ingredient.

EXAMPLE XXIV

A 24% fat content hypoallergenic dark chocolate formulation is prepared according to the procedure of Example XXI from the following ingredients in the following amounts:

|  | Wt % | Kcal/g | Kcal/100 g of chocolate |
|---|---|---|---|
| Super critical CO$_2$-defatted cocoa powder (99.99% fat free) | 21.0 | 1.6 | 33.6 |
| Hypoall. butter fat | 0.6 | 4.0 | 2.40 |
| Soy lecithin (35% phosphatidyl choline) | 0.6 | 7.0 | 4.20 |
| Natural vanilla | 0.1 | 4.0 | 0.40 |
| Cocoa butter | 23.4 | 9.0 | 210.6 |
| Maltitol | 54.3 | 4.0 | 168.0 |
| Total: | 100 |  | 419.01 |

EXAMPLE XXIVa

Example XXIV is repeated except that the fats (butter fat, lecithin and cocoa butter) are first combined into a fat component mixture, which is then added to the remaining ingredient.

EXAMPLE XXV

A 24% fat content hypoallergenic milk chocolate is prepared according to the procedure of Example XX from the following ingredients in the following amounts:

|  | Wt % | Kcal/g | Kcal/100 g of chocolate |
|---|---|---|---|
| Super critical CO$_2$-defatted cocoa powder (99.99% fat free) | 31.0 | 1.6 | 49.6 |
| Hypoall. whey permeate | 18.0 | 4.0 | 72.0 |
| Hypoall. butter fat (stearine fraction) | 0.6 | 9.0 | 5.0 |
| Soy lecithin (35% phosphatidyl choline) | 0.6 | 7.0 | 4.20 |
| Natural vanilla | 0.1 | 4.0 | 0.40 |
| Deodorized Malaysian cocoa butter (stearine fraction) | 11.7 | 9.0 | 105.34 |
| Caprenin | 11.7 | 5.0 | 58.5 |
| Maltitol | 26.0 | 4.0 | 104.0 |
| Total: | 100.00 |  | 399.4 |

EXAMPLE XXVI

A hypoallergenic chocolate-coated ice cream was prepared as follows. The following ingredients were mixed thoroughly together and pasteurized at 180° F. for 5 minutes, and then homogenized in a high-speed milk homogenizer:

| Hypoall. whey permeate powder | 120 g |
|---|---|
| Hypoall. butterfat (containing 0.05% alpha tocopherol) | 140 g |
| Maltitol | 251 g |
| Gelatin (250 bloom strength) | 6 g |
| Vanilla extract (2-fold concentrate) | 3 g |
| Distilled water | 480 g |

The homogenized mixture was allowed to age under refrigeration for 24 hours, molded into approximately 1½×1½×1 inch squares, and then frozen. The frozen squares were then demolded and coated with a mixture comprising 90% hypoallergenic dark chocolate coating prepared according to Example XXI and 10% rice bran oil. The coating procedure consisted of enrobing the chocolate squares with the coating mixture at 80–82° F. for 5–10 seconds, followed by freezing the coated squares in a metal tray.

The ice cream preparation of the previous example may optionally include a step of whipping the homogenized mixture during freezing to the desired volume increase or overrun.

The 10% rice oil/90% hypoallergenic dark chocolate coating of the Example XXVI chocolate-coated ice cream product contrasts with conventional chocolate-coated ice cream products which typically contain a coating of 70–75% conventional chocolate, the balance comprising coconut oil. Both conventional chocolate and coconut oil are a source of allergens.

EXAMPLE XXVIa

A homogenized mixture was prepared as in Example XXVI. The mixture was then whipped during freezing to form a "Schlag" (whipped butter).

EXAMPLE XXVII

High phosphatidylcholine lecithin, sugar-free, chocolate-flavored aspirin was prepared as follows. Dark chocolate was prepared according to Example XXI, except that the lecithin utilized comprised a high phosphatidyl choline content lecithin (35–100% phosphatidyl choline). The chocolate was mixed into a paste, passed through steel rollers for refining to a 25 micron particle size, and then remelted. The chocolate was formed into 750 mg units. Eighty-one mg of powdered acetylsalicylic acid was inserted into each unit. The chocolate-flavored aspirin may be utilized as a pleasant tasting, high mucosal penetrating and oral absorbable delivery system which is maintained sublingually in the mouth until completely dissolved. The product will not promote tooth decay, since it is sugar-free.

EXAMPLES XXVIIa, XXVIIb and XXVIIc

Example XXVII is repeated, but substituting for the 81 mg of acetylsalicylic acid: 10 mg hydroxyzine, to serve as an antihistamine/antimigraine medication; 5 mg dextromethorphan, as a cough suppressant remedy; 5 mg dextromethorphan and 50 mg glyceryl guaiacolate or potassium guiacosulfate, as a cough suppressant mucous thinner expectorant tablet.

EXAMPLE XXVIII

A chocolate-flavored elemental feeding was prepared as follows. One teaspoon of the powder according to Example XIV and two tablespoons of a synthetic amino acid nutrient powder mixture containing glucose (Neocate+EO28, Scientific Hospital Supplies, Gaithersberg, Md.) were added to 6–8 ounces of distilled water and stirred well. The beverage was tolerated by the chocolate allergic patient without reaction.

EXAMPLE XXIX

The procedure of Example XXVI was repeated, except that the hypoallergenic whey permeate powder was replaced by 120 grams of finely ground, finely meshed, concentrated rice protein.

EXAMPLE XXX

A hypoallergenic beverage was prepared as follows. The following ingredients were combined to form a 1000 gram mixture as a chocolate-flavored, sugarless powder:

| | |
|---|---|
| Cocoa butter | 15 grams |
| Super critical $CO_2$-defatted cocoa powder | 135 grams |
| Refined soybean oil | 150 grams |
| Maltitol | (q.s.) 1000 grams |
| Lecithin | 4 grams |
| Natural vanilla | 1 gram |

The lecithin and vanilla were the last ingredients to be added to the mixture. The mixture was refined over refining rolls to a powdery ground matrix useful as a powdered chocolate flavoring. Two to three teaspoons of this powder were added with stirring to six to eight ounce glasses containing a soybean beverage. Soybean beverages are commercially available as milk substitutes. In lieu of soybean beverage, other milk substitutes may be used, e.g., liquid formulations of amino acids or short-chain polypeptides, such as those formulations which have utility as enteral or elemental feeding preparations.

EXAMPLE XXXI

A sugar-free, moldable chocolate not requiring tempering or retempering, hypoallergenic as to its cocoa component but not its dairy component, is prepared as follows: A commercially available dairy protein concentrate (milk protein concentrate, 4% lactose; whey protein concentrate 60%, 40% lactose and mineral salts; or sodium or potassium caseinate) is combined with super critical $CO_2$-treated cocoa powder, on the basis of 11.4 parts dairy protein concentration to 7 parts cocoa powder, based upon dry weight. The mixture is pasteurized for 30 minutes, followed by spray drying in a spray drying oven. The following ingredients are mixed, followed by conching for 36 hours at 145° F., at a stirring speed of up to 2–3 revolutions per second.

| | |
|---|---|
| Pasteurized, dried $CO_2$-defatted cocoa powder/dairy protein concentrate | 18.4 |
| Anhydrous milk fat stearine fraction | 0.6 |
| Lecithin | 0.4 |
| Natural vanilla | 0.1 |
| Maltitol | 48.1 |
| Thermally stable hydrogenated palm kernel oil | 28.4 |

The resulting chocolate is prepared as multiple wafer discs, melted in a double boiler for 5 minutes at 130° F. and then poured into a mold and allowed to cool in a refrigerator for 5–10 minutes.

EXAMPLE XXXII

A sugar-free, moldable hypoallergenic chocolate not requiring tempering or retempering is prepared as follows. A fat mixture (hereinafter "fat mixture A") is prepared by combining 1.4% high phosphatidylchlonine content lecithin, 2.0% clarified anhydrous milk fat stearine fraction containing 0.05% α-tocopherol and 96.6% fractionated hydrogenated palm kernel oil (Satina N.T.). The fat mixture is combined with other ingredients as follows, then followed by conching for 36 hours at 145° F., at a stirring speed of up to 2–3 rps. The additional 0.4 phosphatidyl choline apart from fat mixture A is added to the mixture late in the conching stage.

| | |
|---|---|
| Super critical CO$_2$-defatted cocoa powder | 7.0 |
| Hypoallergenic whey permeate powder | 11.4 |
| Natural vanilla | 0.1 |
| Maltitol | 57.1 |
| Fat mixture A | 24.0 |
| High phosphatidyl choline lecithin | 0.4 |

EXAMPLE XXXIII

A sugar-free, moldable chocolate, hypoallergenic as to its cocoa component but not as to its dairy component, is prepared by repeating Example XXXI, but substituting the individual milk fat, lecithin and palm kernel oil ingredients with the identical amount of fat mixture A, except that anhydrous milk fat stearine fraction of fat mixture A is not clarified.

EXAMPLE XXXIV

A reduced-fat, reduced-calorie composition is prepared by repeating the procedure of Example XXXII, substituting fat mixture A with an identical amount of the following fat mixture B:

Fat mixture B:

| | |
|---|---|
| High-phosphatidylcholine lecithin | 1.4 |
| Anhydrous milk fat stearine fraction (containing 0.05 α-tocopherol) | 2.0 |
| Satina N.T. | 47.8 |
| Caprenin | 47.8 |

EXAMPLE XXXV

A reduced fat and calorie chocolate composition is prepared by repeating the procedure of Example XXXII, substituting fat mixture A with an identical amount of the following fat mixture C:

Fat Mixture C

| | |
|---|---|
| High phosphatidylcholine lecithin | 1.4 |
| Anhydrous milk fat stearine fraction | 2.0 |
| Malaysian cocoa butter, stearine fraction | 48.3 |
| Caprenin | 48.3 |

EXAMPLE XXXVI

A reduced fat chocolate composition is prepared by repeating the procedure of Example XXXII, substituting fat mixture A with an identical amount of the following fat mixture D:

Fat Mixture D

| | |
|---|---|
| High phosphatidylcholline lecithin | 1.4 |
| Anhydrous milk fat stearine fraction | 2.0 |
| Kaopreme E | 48.3 |
| Caprenin | 48.3 |

EXAMPLE XXXVII

A reduced fat chocolate composition is prepared by repeating the procedure of Example XXXII, substituting fat mixture A with an identical amount of the following fat mixture E:

Fat Mixture E

| | |
|---|---|
| High phosphatidylcholine lecithin | 1.4 |
| Anhydrous milk fat stearine fraction | 2.0 |
| West African cocoa butter | 96.6 |

This chocolate is tempered after conching because of the substitution of fat mixture E which contains cocoa butter (not moldable).

EXAMPLE XXXVIII

A reduced fat chocolate is prepared by repeating the procedure of Example XXV substituting the fat components (hypoallergenic butter fat, deodorized Malaysian cocoa butter, stearine fraction, caprenin and soy lecithin) with an identical total amount of fat mixture C, with the exceptions that (i) the anhydrous milk fat stearine is clarified for hypoallergenic usage, and (ii) 0.4% of high phosphatidylcholine lecithin is added late in the conching stage.

EXAMPLE XXXIX

A reduced fat chocolate (24% fat), which is hypoallergenic as to its chocolate component but less so for its dairy component, was prepared by repeating the procedure of Example XXV with the exceptions that (i) a heat-treated skim milk was substituted for the hypoallergenic whey permeate, (ii) the fat component (hypoallergenic butter fat, deodorized Malaysian cocoa butter, caprenin and soy lecithin) was replaced with an identical amount of fat mixture "F" described below, and (iii) 0.3% of the high phosphatidyicholine content lecithin of fat mixture F was added late in the conching stage. The material was conched at 135° F. for four hours.

Fat Mixture F:

| | |
|---|---|
| Cocoa butter | 86.8% |
| Anhydrous milk fat stearine fraction | 8.3% |
| Anhydrous milk fat | 4.1% |
| High phosphatidylcholine lecithin | 0.8% |

The total composition ingredients are listed below:

| | |
|---|---|
| Fat Mixture F | 24.2% |
| High heat treated skim milk powder (replacement for milk permeate powder) | 14.0% |
| Super critical CO$_2$ treated cocoa powder, defatted | 7.0% |
| Sugar | 54.3% |

-continued

| | |
|---|---|
| Vanillin (instead of natural vanilla) | 0.05% |
| High phosphatidylcholine (added late in conching stage) | 0.3% |

EXAMPLE XL

A reduced fat chocolate (24% fat) for enrobing, panning and molding, hypoallergenic for its chocolate content but less so for its dairy component, was prepared by repeating the procedure of Example XXV with the following modifications (i) a heat-treated skim milk was substituted for the hypoallergenic whey permeate, (ii) the fat component (hypoallergenic butter fat, deodorized Malaysian cocoa butter, caprenin and soy lecithin) was replaced with an identical amount of fat mixture "G" described below, and (iii) 0.3% of the high phosphatidylcholine content lecithin of fat mixture G was added late in the conching stage. The material was conched at 135° F. for four hours.

Fat Mixture G:

| | |
|---|---|
| Hydrogenated fractionated palm and cottonseed oils, CLSP 870 Van Den Bergh Foods Company | 86.8% |
| Anhydrous milk fat stearine fraction | 8.3% |
| Anhydrous milk fat | 4.1% |
| High phosphatidylcholine lecithin | 0.8% |

The total composition ingredients are listed below:

| | |
|---|---|
| Fat Mixture G | 24.2% |
| High heat treated skim milk powder (replacement for milk permeate powder) | 14.0% |
| Super critical $CO_2$ treated cocoa powder, defatted | 7.0% |
| Sugar | 54.3% |
| Vanillin (instead of natural vanilla) | 0.05% |
| High phosphatidylcholine (added late in conching stage) | 0.3% |

EXAMPLE XLI

Hypoallergenic chocolate liquor was prepared as follows. One hundred pounds of chocolate liquor (commercially available in five pound molded format) was broken into fragments, which were placed in a chocolate kettle and melted 25 lbs. at a time. Five pound portions of the melted chocolate liquor were placed in stainless steel drawers. Each five pound portion was processed by contacting the portion with liquid nitrogen for 15 to 20 minutes. After processing, the chocolate liquor was melted and used in compositions according to the invention.

EXAMPLE XLII

A Standard of Identity, reduced-fat chocolate was prepared as follows. A fat mixture "H" was prepared by mixing 2.64 lbs of anhydrous milk fat stearine fraction, 1.4 lbs anhydrous milk fat, 11.2 lbs cocoa butter and 0.2 lbs high phosphatidylcholine lecithin. 15.5 lbs of fat mixture H was combined with 1 lb of super critical $CO_2$-defatted cocoa powder, 14 lbs of non-fat milk powder, 0.05 lb vanillin, 80.05 lbs sucrose, 0.25 lbs cocoa butter, and 16 pounds of liquid $N_2$-treated chocolate liquor (prepared as in Example XLI). The mixture was conched at 135° F. for 4 hours. An additional 0.3 lbs of high phosphatidylcholine lecithin was added late in the conching. The fat composition was 23.5 wt %.

EXAMPLE XLIII

A bakery milk chocolate compound coating was prepared as follows. A fat mixture "I" was prepared by mixing 22.0 lbs palm kernel oil, 1.32 lbs anhydrous milk fat stearine fraction and 0.2 lbs high phosphatidylcholine-content lecithin. 23.52 lbs of fat mixture I was combined with 89.36 lbs sucrose, 9 lbs. super critical $CO_2$ treated (>99% defatted) cocoa, 9.26 lbs non-fat milk, 0.1 lb vanillin and 0.1 lb NaCl. The mixture was conched for 4 hours at 140° F. and 10–15 rpm. An additional 0.3 lb of high phosphatidylcholine-content lecithin was added in the final stages of conching.

EXAMPLE XLIIIa

A reduced fat hypoallergenic bakery chocolate coating was prepared using an food extruder single screw type instead of a conch. 392 grams of super critical $CO_2$ treated alkalized cocoa (99% defatted) and 1119.6 grams of sugar were blended and refined at 45 to 50 microns using a three roller refiner. To this was added 333.2 grams (70% of the fat) of a high melt lauric confectionery fat hydrogenated vegetable source. Three grams of 1% high melt seed was included in the 333.2 grams of fat, and 10 grams of high phosphatidyl choline soy lecithin was added. 1.2 grams of vanillin and 1.2 grams of salt were also added. The mixture (1857.2 grams) was warmed, melted, blended together and extruded through a single screw type spiral screw extruder to express all possible air (because air caused increased viscosity in prior tests).

The mixture was added to a warm jacketed planetary mixer at 90 to 100° F. and the remaining 30% or 143.8 grams of confectionery fat was added (1.4 grams of high melt seed was included in the 143.8 grams of confectionery fat).

The resulting reduced fat (24.8%) hypoallergenic chocolate bakery coating had a viscosity and functionality very similar to a 32% full fat bakery coating. This method is useful in the many industrial circumstances where an expensive conch and highly trained technical help are not available.

EXAMPLE XLIV

A reduced fat hypoallergenic crisp rice chocolate composition fortified with 19 vitamins and minerals was prepared as follows.

An approximately fifty pound batch of chocolate vehicle contained the following ingredients.

| | |
|---|---|
| Demineralized whey powder | 2.5 lbs. |
| Super critical $CO_2$ treated defatted cocoa powder | 3.5 lbs. |
| High heat treated skim milk powder | 4.5 lbs. |
| Vanillin | 0.025 lbs. |
| Benefat #1 seed | 0.525 lbs. |
| Stearine seed fat soy derived (commercially available) | 0.525 lbs. |
| Anhydrous milk fat (AMF) stearine fraction | 0.25 lbs. |
| Glyceryl Mono Oleate Kosher (GMOK) | 0.025 lbs. |

-continued

| | |
|---|---|
| Lecithin (32% phosphatidyl choline) | 0.25 lbs. |
| Sugar | 27.225 lbs. |
| Benefat #1 | 11.925 lbs. |

Benefat #1 is a commercially available Salatrim product, a low calorie confectionery vegetable soy fat. To prepare a high melt seed so that the final confectionery coating would set, Benefat #1 was treated for 48 hours at 90° F. in a hot room. The oleins were then strained off using a $\frac{1}{16}$" stainless steel screen strainer, and the stearine fraction was used in the chocolate vehicle. Anhydrous milk fat seed was made in the same fashion as Benefat #1 seed. The fat content of the chocolate vehicle was as follows.

| Total Fatty Constituents | | |
|---|---|---|
| | % | Nutritionally Available % Fat |
| Benefat | 23.85 @ 55% = | 13.12 |
| Benefat Stearine | 1.05 @ 55% = | 0.58 |
| High Melt (150–160° F.) Stearine Seed Fat, Soy-derived | 1.05 | 1.05 |
| GMOK | 0.05 | 0.05 |
| High PC Lecithin (32% phosphatidylcholine) | 0.50 @ 67% = | 0.34 |
| AMF Stearine | 0.50 | 0.50 |
| | 27.00% | 15.64% |

In this composition the level of Salatrim was increased from 24.5% to 27% in order to reduce viscosity and permit enrobing and molding functionality. The product was conched for approximately two hours at 145° F., then approximately two hours at 120° F. In the case of 50 or 100 lb. batches, a Frisse or Frisse-type (overbeating kneader mixer) or MacIntyre-type (beater blade mill) conch was used. In the case of a 1000 lb. batch (20×batch), a Baurmeister kneader mixer conch was used. The Baurmeister (kneader mixer) conch as well as the Ball Mill conch were used in 1000 lb. batches of Example XLII production of Standard of Identity chocolate. In 100 lb. batches the Frisse type (overbeating kneader mixer) and the MacIntyre type (Beater Blade Mill) were used. Half of the lecithin was added at the end (approximately last half hour) of the conching process. In some preparations lecithinated sugar (using one half high phosphatidylcholine lecithin) was used. Lecithinated sugar was prepared as follows: Lecithin (0.25%) and MGOK (0.025%) were warmed to 90° F. and sprayed with a spray gun onto sugar at 90° F. while the sugar was revolving 15 rpm in a Hobart blender to retain a temperature of 90° F.

A concentrated mix (180 g) containing 19 vitamins and minerals was added to 50 lbs. of chocolate vehicle before removal from the conch. The mixture was then removed from the conch, 5% crisp rice was added, and the composition was thoroughly blended by mixing. Twenty five lbs. of the mixture (at 110° to 120° F.) was molded, using factory assembly line chilled rotary molding rolls, into five gram ovalettes. The final composition had a pleasant milk chocolate taste, without detectible vitamin or mineral taste, and was well tolerated by two migraine patients reactive primarily to chocolate, one an adult female with GI allergy manifested by GI bleeding due to chocolate and one adult male patient. The female patient was allergic to both chocolate and milk, and both patients had been unable to eat chocolate for several decades. The composition, which had the following nutritional analysis, was well tolerated by both patients without the symptom of migraine in either patient or G.I. bleeding. Taste and texture were very good based on a taste panel.

REDUCED FAT CRISP RICE CHOCOLATE Detailed Nutritional Description: Composition Fortified with 19 Vitamins and Minerals

| NUTRITION FACTS | | |
|---|---|---|
| Serving Size | 8 Pieces | (42 g.) |
| Calories | 171.11 g. | |
| Calories from Fat | 51.44 g. | 30% Calories from Fat |

| | Amount/serving |
|---|---|
| *Total Fat | 5.72 g. |
| *Saturated Fat | 5.72 g. |
| Cholesterol | 0 |
| Sodium | 33.93 g. |
| Total Carbohydrate | 30.97 g. |
| Dietary Fiber | 0.18 g. |
| Sugars | 28.59 g. |
| Protein | 2.18 g. |

| RDA | % Recommended Daily Allowance |
|---|---|
| Vitamin A | 22.5% |
| Vitamin C | 22.5% |
| Calcium | 3.60% |
| Iron | 22.5% |
| Vitamin D | 18.0% |
| Vitamin E | 18.0% |
| Thiamin | 22.5% |
| Riboflavin | 22.5% |
| Niacin | 22.5% |
| $B_6$ | 18.0% |
| Folic Acid | 12.08% |
| $B_{12}$ | 22.5% |
| Biotin | 22.5% |
| Pantothenic Acid | 22.5% |
| Potassium | 3.60% |
| Magnesium | 3.60% |
| Iodine | 22.5% |
| Zinc | 22.5% |
| Copper | 22.5% |

Percent Daily Values are based on a 2,000 calorie diet. Your daily values may be higher or lower depending on your calorie needs.

| | Calories | 2,000 | 2,500 |
|---|---|---|---|
| Total Fat | Less than | 65 g | 80 g |
| Sat. Fat | Less than | 20 g | 25 g |
| Cholesterol | Less than | 300 mg | 300 mg |
| Sodium | Less than | 2,400 mg | 2,400 mg |
| Total Carbohydrate | | 300 g | 375 g |
| Dietary Fiber | | 25 g | 30 g |
| Calories per gram: | | | |
| Fat 9, Carbohydrate 4, Protein 4 | | | |

INGREDIENTS: Mild Chocolate Compound Coating (sugar, benefat, skim milk, & whey, mild fat, soy lecithin-an emulsifier and a natural source of unsaturated fat, essential fatty acids and choline, vanillin-an artificial flavoring), crisped rice, rice, sugar, salt, malt).
*Saturated Fat-This low caloric density fat has 4.95 calories per gram in contrast to 9 calories per gram for conventional fat. The $C_2$ and $C_3$ portion of this fat (45%) decreases the caloric density and does not have the health risks of long chain fatty acids ($C_2$ and $C_3$ are not classified as fatty acids) in that it is readily metabolized like carbohydrates, even more so than unsaturated fat and in contrast to the high molecular weight fats used in body storage.

EXAMPLE XLIVa

A 1500 pound batch of reduced fat reduced calorie chocolate compound coating was prepared using the same ingredients and proportions as the chocolate vehicle of Example XLIV with the following exceptions: a) the high melt soy derived stearine seed fat was replaced with medium melt palm seed; b) the Benefat #1 seed was replaced with Benefat #1; and c) the total percentage of Benefat #1 was increased from 22.4% to 24.9%. The additional 2.5% of Salatrim was added in order to bring the total fat to 27% and to bring the MacMichael viscometry measurement to 250.

The dry ingredients, including the cocoa, sugar, and milk were mixed in a mixing tank and ground in a stainless-steel high speed mill grinder (having angled cutting edge stainless steel blades and adjustable settings, as used in the chocolate industry), then screened through an adjustable mesh (screen) having a mesh size of 0.0009 inch (22.86 microns).

The fats were melted and added to the overbeating kneader mixer conch, then the ground dry ingredients were placed in the conch and the mixture was conched for forty minutes.

When the chocolate was examined under a dissecting microscope at 300× magnification using both reflected and transmitted light, the very fine particles appeared as opaque to translucent brownish uniform sized particles. In contrast, chocolate processed using only 4% Salatrim (an alpha crystal fat), with the remaining (majority) of the fat being soy confectionary 870 hydrogenated fractionated fat (a beta crystal fat), appeared as much larger ordered and tightly packed opaque to translucent refractile spherical particles.

EXAMPLE XLIVb

Example XLIVa is repeated except that the grinder and mesh screen are reset for 0.0016 (40.64 micron) spheres.

EXAMPLE XLV

Five pounds of a composition comprising vitamins and minerals in a hypoallergenic chocolate vehicle was prepared from a 1000 lb. batch with proportions as in Example XLIV, but with the following modification: 532.5 mg of the vitamin and mineral mix was added per 1½ oz. of product. Non lecithinated sugar was used, and therefore an additional 2% Salatrim was required to achieve viscosity reduction to mold and enrobe. To further insure good taste, 0.165% orange oil was added to one half of the final composition. The composition was laboratory molded into 28 gram (one ounce) bars, which were well tolerated by two migraine patients reactive primarily to chocolate and an allergic patient. The bars had a nutritional analysis similar to the ovalettes in Example XLIV, except for the following higher concentrations of vitamins and minerals.

Serving Size 1½ bars (1.5 oz. 42 g)

| RDA | % Recommended Daily Allowance |
|---|---|
| Vitamin A | 37.5% |
| Vitamin C | 37.5% |
| Calcium | 4.0% |
| Iron | 37.5% |
| Vitamin D | 30.0% |
| Vitamin B | 30.0% |
| Thiamin | 37.5% |
| Riboflavin | 37.5% |
| Niacin | 37.5% |

-continued

| RDA | % Recommended Daily Allowance |
|---|---|
| $B_6$ | 30.0% |
| Folic Acid | 15.0% |
| $B_{12}$ | 37.5% |
| Biotin | 37.5% |
| Pantothenic Acid | 37.5% |
| Potassium | 6.0% |
| Magnesium | 6.0% |
| Iodine | 37.5% |
| Zinc | 37.5% |
| Cu | 37.5% |

EXAMPLE XLVa

A crisp rice chocolate composition was prepared as in Example XLIV except that: (1) the vitamin and mineral mix was omitted, and (2) crisp rice was added to a final concentration of 10%. Salatrim fat contracts poorly, so the composition was molded in a confectionery paper cup to achieve moldability.

The composition was noted to have a good taste and texture by a taste panel. Samples were well tolerated by two migraine patients reactive to chocolate and without the symptoms of GI bleeding in an adult female patient with GI allergy.

EXAMPLE XLVb

A reduced fat hypoallergenic chocolate compound coating was prepared in a hundred pound batch using the following ingredients and the method of Example XLIV.

| | |
|---|---|
| Sugar | 54.45 lb. |
| Demineralized whey | 5.0 lb. |
| Soy lecithin phosphatidyl choline | 0.5 lb. |
| Almond oil | 2.5 lb. |
| Defatted super critical $CO_2$ treated alkalized cocoa | 7.0 lb. |
| Skim milk powder, high heat treated | 9.0 lb. |
| Higher melting point Salatrim soy vegetable fat (similar to cocoa butter, but not requiring hard fat addition as commercially available Benefat #1) | 20.2 lb. |
| Sorbitan tristearate | 0.75 lb. |
| Glyceryl monoleate (kosher) | 0.05 lb. |
| Anhydrous milk fat stearine | 0.5 lb. |
| Vanillin | 0.05 lb. |
| | 100.00 lbs. |

The product was conched for two hours at 140° F. then for two hours at approximately 120° F. A Frisse type (overbeating kneader mixer) conch was used. Half of the lecithin was added at the end (approximately the last half hour) of the conching process. Prior to conching the product was refined to a three-roller refiner to a particle size of approximately 35 microns.

Additional Salatrim was added to the total fat so that the fat total would be 27% and to permit enrobing functionality to minimize the above deposition of chocolate on the enrobing line, the deposition by the enrobing curtain was adjusted to bring the fan, after the chocolate was deposited, closer to the cakes involved, to blow off the excess chocolate. The temperature of the chocolate and the cakes were kept as warm as possible, 145° F. to 155° F., to enhance enrobing and viscosity reduction. The automated shaker was also adjusted to maximize the reduction of excess chocolate deposition.

The heavier cakes such as a granola bar permitted a 25% deposition of chocolate by weight, whereas with the lighter cakes such as a Graham cracker and the social tea biscuit, because of their lightness, it was more difficult to blow off as much excess enrobing chocolate and a 45% to 50% chocolate coating deposit by weight resulted. The reduced fat chocolate is a lighter weight chocolate and is easier to blow off excess enrobing chocolate than the denser commercial non-reduced fat chocolate.

The honey Graham cracker particle size was measured to be 50 microns. Therefore, the particle size of a Salatrim coating in this example could be increased to 45 to 50 microns (without the tongue noticing any granularity difference). And so, refining to 45 to 50 microns prior to conching would greatly reduce the viscosity further for enrobing purposes.

To maximize the reduction in viscosity in preparing the above chocolate coating for enrobing purposes the following emulsifiers were compared:

The viscometer used was a MacMichael and the comparative viscometry were measured in degrees of rotation of the spindle in the warmed chocolate coating (warmed to 120° F.). The greatest reduction in viscosity occurred with cocoa butter phospholipid at 1% concentration, with a reduction in viscosity from 219 MacMichael to 195 MacMichael.

Soy lecithin, 35% phosphatidyl choline, resulted in a minimal reduction in viscosity to 213. An additional 0.5% almond oil increased the viscosity to 250 (from 219). An additional 0.5% rice oil or almond oil also increased the viscosity of the above coating to 240 MacMichael (from 219). Glyceryl mono-oleate (kosher) (0.1%) with soy lecithin 35% phosphatidyl choline (0.5%) increased viscosity to 230 MacMichael (from 219).

The addition of Glyceryl mono-oleate (kosher) 0.1% to cocoa butter phospholipid 1% reduced the viscosity further to 187 (from 219).

The cocoa butter phospholipid was derived by degumming minimally or non-deodorized cocoa butter and vacuum drying this product. The use of this emulsifier was prompted by the discovery that minimally or non-deodorized cocoa butter, whether African, Malaysian or Brazilian, aided viscosity reduction of a Standard of Identity hypoallergenic chocolate, as in Example XLII.

EXAMPLE XLVc

Conventionally, it has been taught that compound coating does not require tempering. In the case of Salatrim compound coating an exception to this rule has been noted by this inventor. The foregoing embodiments in Example XLIII illustrates enhanced functionality by tempering with cold or freezing temperatures permitting molding, particularly demolding, since the Salatrim fails to contract at room temperature. It has been further noted here that this enhanced functionality could be extended over to laboratory determinations for total fat with conventional Soxhlet total fat determination techniques. The routine Soxhlet method results in the absence of tempering.

It was unexpectedly discovered that molded and demolded Salatrim chocolate coatings could be accurately analyzed for total fat by routine Soxhlet using routine 4 hour defatting and expected results of 27% were obtained, (enrobing Example XLVb).

Where, without using this unexpectedly discovered cold or frozen processing, the conventional methodology has been reported as problematic, in published and in personal communications. Repeated and specifically designed modifications for Salatrim fat assay determination by Soxhlet wherein overnight 12 to 15 hour fat solvent defattings resulted in determinations that did not correlate with the known composition of fat (high).

EXAMPLE XLVI

Hypoallergenic peanut flour was prepared as follows. Approximately eight lbs. of reduced fat (11%) high protein peanut flour was treated in a styrofoam container (in other experiments a stainless steel tray is used). Liquid nitrogen was poured onto the peanut flour, and the peanut flour was submerged in the liquid nitrogen for twenty minutes.

The particle size of the peanut flour was measured, using a micrometer, before and after treatment. Each sample was measured ten times, and an average value was calculated. The results of the micrometry measurements are shown in the following table.

| Comparative Particle Size of Peanut Flour (in microns) | | |
| --- | --- | --- |
| | untreated peanut flour | liquid nitrogen treated peanut flour |
| | 115 | 25 |
| | 59 | 47 |
| | 63 | 39 |
| | 160 | 49 |
| | 57 | 40 |
| | 83 | 21 |
| | 174 | 36 |
| | 107 | 28 |
| | 87 | 57 |
| | 95 | 34 |
| Average | 100.00 | 37.6 |

On average, the particle size of the peanut flour after treatment was reduced to about ⅓ of the original particle size: from an average of 100 microns to an average of 37.6 microns.

The taste of the treated flour appeared to be unchanged, or improved, as compared to untreated flour.

A comparative ELISA method was used to measure peanut allergens in the flour before and after treatment. A plate was coated with polyclonal antibody from a rabbit sensitized to peanut. Picogram quantities of peanut sample were applied to the plate, and peanut allergens were quantified using a biotin-avidin enzymatic detection system.

The ELISA results from two treated samples are shown on the following table.

| Sample | Peanut Allergen (in pg/ml) |
| --- | --- |
| untreated peanut flour #1 | $0.3 \times 10^6$ |
| liquid nitrogen treated peanut flour #1 | 2000 |
| untreated peanut flour #2 | $0.4 \times 10^6$ |
| liquid nitrogen treated peanut flour #2 | 1400 |

In this example, the treated flour showed a 150–285-fold (average 218-fold) reduction in peanut allergen as compared to untreated flour.

EXAMPLE XLVII

Approximately eight pounds of peanut paste were treated with liquid nitrogen as in Example XLVI.

EXAMPLE XLVIII

A reduced fat hypoallergenic peanut butter or peanut spread is prepared without the addition of water, using the peanut flour and peanut paste treated as in Examples XLVI and XLVII. High roast peanut oil (extract) is treated with liquid nitrogen by immersing the peanut oil in liquid nitrogen for twenty minutes. The final composition comprises:

| | |
|---|---|
| Sugar | 17.63 lbs. |
| Fat, Lauric (commercially available confectionery fat that contains $C_{12}$ lauric fatty acid | 4.74 lbs. |
| Liquid Nitrogen Treated Peanut Oil | 1.25 lbs. |
| Liquid Nitrogen Treated Peanut Paste (40%) fat, 100% peanut composition) | 14.75 lbs. |
| Liquid Nitrogen Treated peanut flour (12% fat) | 5.87 lbs. |
| Demineralized Whey (having 25% of the minerals removed) | 5.50 lbs. |
| Salt | 0.14 lbs. |
| Lecithin (32% high phosphatidylcholine) | 0.3 lbs. |
| | 0.2 lbs. (added at end of conch) |
| Citric Acid | 22.7 g |
| Total | 50.43 lbs. |

The composition is conched for approximately three to four hours at 111° F. to 122° F.

EXAMPLE XLVIIIa

Peanut butter was prepared as in Example XLVIII, except that untreated peanut flour, peanut oil, and peanut paste were used.

EXAMPLE XLVIIIb

To prepare a hypoallergenic product, the final composition of Example XLVIIIa is treated with liquid nitrogen for fifteen to twenty minutes.

The composition can be used as a reduced fat hypoallergenic peanut spread, or as an ingredient in confections and other foods.

EXAMPLE XLVIIIc

A reduced fat hypoallergenic peanut butter cup is produced using 10 lbs. of Standard of Identity reduced fat hypoallergenic chocolate as prepared in Example XLII, and 10 lbs. of reduced fat hypoallergenic peanut butter as prepared in Example XLVIII or Example XLVIIIb, at a temperature of 84° F. to 86° F. The peanut butter cups are formed in paper cups using a laboratory model one-shot machine (manufactured by Microvert), containing two rotary valves which open in s sequence to deliver the chocolate and peanut butter components.

Reduced fat hypoallergenic peanut butter cups are also produced using the Salatrim chocolate compound coating of Example XLVb at a temperature of 110° F.

Reduced fat hypoallergenic chocolate pecan butter cups are also produced, using the Standard of Identity or Salatrim chocolate and reduced fat hypoallergenic pecan butter. The pecan butter is prepared as in Example XLVIII or Example XLVIIIb by substituting pecan paste, pecan oil, and pecan flour for the peanut paste, peanut oil, and peanut flour.

EXAMPLE XLVIIId

Peanut butter cups were prepared as in Example XLVIIIc, substituting the untreated peanut butter of Example XLVIIIa for the hypoallergenic peanut butter. These peanut butter cups were tolerated by two migraine patients intolerant to chocolate and one patient with G.I. allergy to chocolate.

EXAMPLE XLVIIIe

To prepare reduced fat chocolate panned defatted pecans, 4.25 lbs. of reduced fat (naturally defatted) pecans were panned with 18 lbs. Salatrim compound coating as prepared in Example XLVb. The pecans were warmed to 90° F., coated with gum arabic, dried, and cocoa was added. The treated pecans, at 90° F., were sprayed with Salatrim compound coating at 110° F. to 120° F., using a confectionery spray gun. The pecans were further panned in a rotating coating "pan" and the final product was polished with confectionery glaze.

Reduced fat chocolate panned defatted pecans are also prepared using 18 lbs. of standard of identity chocolate as prepared in Example XLII, and a temperature of 84–86° F. instead of 90° F., or using a mixture containing 70% 10X confectionery sugar and 30% super critical $CO_2$ defatted cocoa in place of the cocoa.

EXAMPLE XLVIIIf

Because the liquid nitrogen treatment of the peanut ingredients increases the functionality of the fat, it is possible to further reduce the fat and oil in the peanut butter of Example XLVIII.

A reduced fat peanut butter is prepared according to Example XLVIII, except that the 4.74 lbs. of lauric fat and 1.25 lbs. of treated oil are omitted.

EXAMPLE XLIX

Hypoallergenic milk was prepared as follows. Five pounds of non-fat high heat powdered nonfat milk was placed in a stainless steel tray. Liquid nitrogen was poured onto the powdered milk sample and the sample was submerged in the liquid nitrogen for twenty minutes.

A direct ELISA method, using serum from a patient known to be allergic to milk, was used to compare the IgE response (relative IgE binding ability) in the milk before and after treatment. Each five gram sample of milk was suspended in 7.5 ml phosphate buffered saline (0.1 M, pH 7.2) and extracted overnight at 5° C. The samples were then centrifuged at low speed for ten minutes. Aliquots of the supernatant (0.1 ml) were placed in microtiter plate wells, and stored overnight at 4° C. Serum was prepared (by allowing blood to clot and pipetting off the supernatant serum) from a milk allergic patient, and 0.1 ml of undiluted serum was added to each well. Non-allergic serum was used as a control. The samples were incubated for one hour at room temperature. Horseradish peroxidase (HRP)-tagged goat Anti IgE (0.1 ml, derived from the serum of a goat immunized with human IgE) was then added to each well, and the plates were incubated for one hour at room temperature. The Anti IgE-IgE complexes were quantitated by adding an HRP substrate (2,2'-Azinobis(3-ethylbenzothiazoline-6-sulfonic acid) diammonium salt, ABTS) and measuring the resulting blue-green color. The results are shown in the following table.

Comparative ELISA Measurements in Milk

| Sample | IgE relative response (counts) |
|---|---|
| Milk (undiluted, commercially available) | 3574 |
| Commercial Agglomerated Dry Milk - Non Fat | 1984 |
| Low Heat Dry Milk - Non Fat | 5153 |
| High Heat Dry Milk - Non Fat | 736 |
| High Heat Dry Milk - Non Fat Plus Liquid Nitrogen Treatment | 502 |
| Background Binding (non-allergic serum) | 500 |

The above milk samples were obtained commercially.

Agglomerated milk is powdered milk which has been rewetted and redried, creating a larger particle which has many air pockets. Lecithin is added to this product. When the product is reconstituted with water, it is more readily wettable because of the air pockets and because the lecithin helps decrease surface tension.

High heat dry milk is skim milk that has been heated to 150° F., and held at that temperature for twenty minutes prior to evaporation. It is then placed in an evaporator to drive off the moisture, and subsequently placed in a tower spray dryer to produce a fine particle non-fat dried milk powder. The heat treatment makes the milk less allergenic, and also increases its affinity for water and water soluble components such as sugar. When high heat dry milk is used in compositions such as chocolate, less fat is required to produce satisfactory mouth feel, texture, and viscosity.

Low heat dry milk is produced like high heat dry milk, except the heating step (150° F. for twenty minutes) is omitted.

These results show that the allergen capacity of milk was completely destroyed by treatment with liquid nitrogen.

EXAMPLE L

Approximately ½ lb. of each of the following foods of high allergic potential were individually treated by immersion in liquid nitrogen contained in a stainless steel cylinder. After ten minutes half of each sample was removed from the liquid nitrogen with a stainless steel ladle, placed in a polyethylene refrigerator bag, and vacuum sealed to remove condensation moisture. After twenty minutes, the other half of each sample was removed from the liquid nitrogen and vacuum sealed in the same fashion.

The liquid nitrogen treated foods included: evaporated milk, instant agglomerated non-fat dry milk, wheat in the form of sliced white bread, whole shelled peanuts, peanut paste, pecans, walnuts, sesame seeds, diced (for more surface exposure) ham (pork product), diced shrimp, diced lobster, diced orange and tomato, barley, and alkalized chocolate liquor (commercially available in a diced form).

The following additional foods are treated in a similar manner: diced hard boiled egg, diced beef and lamb meat, high heat skim milk powder, low heat skim milk powder, evaporated whole milk, reduced fat and full fat peanut butter, condensed milk, cocoa powder (10–12% fat) and alkalized cocoa powder (10–12% fat).

The reduced allergenicity of each sample is confirmed by: (a) ELISA testing using allergic patient serum as described in Example XLIX, and (b) total allergen binding using serum from a sensitized animal, as described in Example XLVI. These two binding capacities are also comparatively analyzed. The particle size and presence or absence of the Maltese Cross is also determined for each treated food.

EXAMPLE La

Liquid nitrogen processing was used to reduce the allergenicity of fresh strawberries, and to render the strawberries free of pathogenic microorganisms.

A 35 pound batch of fresh strawberries was treated by immersion in liquid nitrogen in a steel cylinder for twenty minutes. After the immersion, the strawberries were maintained in the frozen state at −15° F. to 0° F.

The reduced allergenicity is confirmed as described in Example L, and the absence of disease causing microorganisms is confirmed by microbiological methods including culturing of samples before and after treatment.

EXAMPLE Lb

Liquid nitrogen processing is used to reduce the allergenicity of ground beef, and to render the beef free of pathogenic microorganisms.

Thirty five pounds of ground beef is treated by immersion in liquid nitrogen in a steel cylinder for twenty minutes. After the immersion, the beef is transferred to a mechanical freezer and maintained in the frozen state at −10° F. to −15° F.

The reduced allergenicity is confirmed as described in Example L, and the absence of disease causing microorganisms is confirmed by microbiological methods including culturing of samples before and after treatment.

EXAMPLE LI

Cocoa butter lecithin was extracted using the following procedure.

Two percent (w/w) deionized water was added to five gallons of minimally or non-deodorized cocoa butter at 120° F. (50° C.) and the mixture was agitated for one half-hour. The mixture was then allowed to sit for two to three hours. The fat and water were decanted and siphoned off, leaving the heavier gum at the bottom of the container. The gum was vacuum dried at 30 cm (12 in.) Hg. After drying, the lecithin was cooled to 70° F. (20° C.). A light brownish gray lecithin concentrate paste was obtained in a 4% yield.

The cocoa butter lecithin was added to chocolate compositions containing to reduce the viscosity.

EXAMPLE LIa

Cocoa butter lecithin is prepared according to example LI, except that after agitation the heavier hydrated gum layer is separated from the lighter fat and water mixture in a high speed industrial centrifuge, by centrifugation at 10,000 rpm (12,000 G) for 5–15 minutes at 120° F. (50° C.).

All references cited herein, as well as the specifications of U.S. Ser. Nos. 09/058,469, filed Apr. 10, 1998, U.S. Ser. No. 09/058,430, filed Apr. 10, 1998, and U.S. Ser. No. 08/591,503, filed Aug. 2, 1994 (International Filing Date) are incorporated by reference.

The present invention may be embodied in other specific forms without departing from the spirit or essential attributes thereof and, accordingly, reference should be made to the appended claims, rather than to the foregoing specification, as indicating the scope of the invention.

What is claimed is:

1. A method for reducing the allergenicity of a food that comprises wine, comprising:

treating the food comprising wine with super critical fluid or critical liquid carbon dioxide or nitrogen.

2. A method for reducing the allergenicity of a food that comprises fat, comprising:
treating the food with super critical fluid or critical liquid carbon dioxide or nitrogen; and
wherein the fat is not removed from the treated food.

3. A method for reducing the allergenicity of a food that comprises peanut flour, comprising:
treating the food comprising peanut flour with supercritical fluid or critical liquid carbon dioxide or nitrogen; and
whereby the flour is so degraded by the treatment that there is an at least about 50% reduction in the particle size of the flour.

4. The method of claim 3 wherein there is an at least about 65% reduction in the particle size of the flour.

5. A method for reducing the allergenicity of a food that comprises at least partially defatted peanut flour, comprising:
treating the food comprising peanut with super critical fluid or critical liquid carbon dioxide or nitrogen.

6. A method for reducing the allergenicity of a food that comprises starch, comprising:
treating the food with super critical fluid or critical liquid carbon dioxide or nitrogen; and
whereby the starch is so degraded by the treatment that there is an essential absence of birefringent starch granules upon polarizing microscopic examination.

7. A method for reducing the allergenicity of a food that comprises chopped peanuts, peanut flour, or peanut paste, comprising:
treating the food comprising chopped peanuts, peanut flour, or peanut paste with supercritical fluid or critical liquid carbon dioxide or nitrogen;
wherein peanut allergens as measured using ELISA or RIA are decreased at least about 10-fold after treatment.

8. The method of claim 7 wherein peanut allergens are decreased at least about 100-fold after treatment.

9. The method of claim 8 wherein peanut allergens are decreased at least about 285-fold after treatment.

10. A method for reducing the alleruenicity of a food, comprising treating the food with supercritical fluid or critical liquid carbon dioxide or nitrogen for a period of at least 15 minutes.

11. A method according to claim 10, comprising so treating the food for a period in the range of from 15 to 30 minutes.

12. A method for reducing the allergenicity of a food that comprises wine, comprising:
altering the three-dimensional structure of an allergenic component of the food that comprises wine by treating the food with super critical fluid or critical liquid carbon dioxide or nitrogen.

13. The method of claim 10 wherein the food comprises fat and wherein the fat is not removed from the treated food.

14. A method for reducing the allergenicity of a food that comprises peanut flour, comprising:
altering the three-dimensional structure of an allergenic component of the food by treating the food with super critical fluid or critical liquid carbon dioxide or nitrogen
and whereby the flour is so degraded by the treatment that there is an at least about 50% reduction in the particle size of the flour.

15. The method of claim 14 wherein there is an at least about 65% reduction in the particle size of the flour.

* * * * *